US012583055B2

(12) United States Patent
Fix, Jr. et al.

(10) Patent No.: US 12,583,055 B2
(45) Date of Patent: Mar. 24, 2026

(54) AUTOMATED PORTABLE FRICTION WELDING SYSTEM AND METHOD OF OPERATION

(71) Applicants: FUSEMATIC CORPORATION, Ormond Beach, FL (US); Beverly Fix, Okeechobee, FL (US)

(72) Inventors: John William Fix, Jr., Houston, TX (US); John M. Griffin, Houston, TX (US); Thomas Foley, Houston, TX (US)

(73) Assignee: Fusematic Corporation, Edgewater, FL (US)

( * ) Notice: Subject to any disclaimer, the term of this patent is extended or adjusted under 35 U.S.C. 154(b) by 551 days.

(21) Appl. No.: 17/423,172

(22) PCT Filed: Feb. 24, 2020

(86) PCT No.: PCT/US2020/019483
§ 371 (c)(1),
(2) Date: Jul. 15, 2021

(87) PCT Pub. No.: WO2020/176406
PCT Pub. Date: Sep. 3, 2020

(65) Prior Publication Data
US 2022/0143741 A1 May 12, 2022

Related U.S. Application Data

(60) Provisional application No. 62/809,825, filed on Feb. 25, 2019.

(51) Int. Cl.
B23K 20/12 (2006.01)
B23K 20/14 (2006.01)
(Continued)

(52) U.S. Cl.
CPC ...... B23K 20/1285 (2013.01); B23K 20/1295 (2013.01); B23K 20/14 (2013.01);
(Continued)

(58) Field of Classification Search
CPC .... B23K 20/14; B23K 20/22; B23K 20/1285; B23K 20/1295; B23K 2103/04; B23K 2103/10
(Continued)

(56) References Cited

U.S. PATENT DOCUMENTS 3,616,980 A 11/1971 Padilla
3,704,821 A * 12/1972 Loyd .................. B23K 20/1285
228/114.5
(Continued)

FOREIGN PATENT DOCUMENTS

CN 198746 A 6/2007
CN 207757067 U * 8/2018
(Continued)

OTHER PUBLICATIONS

ISR for International Application PCT/US2020/019483 dated Jun. 17, 2020.
(Continued)

*Primary Examiner* — Ronald D Hartman, Jr.
(74) *Attorney, Agent, or Firm* — Mark Andrew Smith

(57) ABSTRACT

An automated system, method and tool for portable friction welding is disclosed for joining a rotatable workpiece to a substrate. A control system is disclosed receiving a start input to cause a motor to rapidly spin the workpiece and initiate a first thrust building cycle acting through an actuator to progressively force the spinning workpiece against the substrate. The materials at this intersection heat and plasticize and the actuator translates toward the substrate until the end of the desired actuator stroke operates to cut the motor (Continued)

off and to initiate and then hold a second axial thrust cycle on the actuator and there through to the interface of the workpiece and substrate. A reset input at the end of a cool off phase releases the thrust in the actuator.

29 Claims, 26 Drawing Sheets

(51) Int. Cl.
    *B23K 20/22*         (2006.01)
    *B23K 103/04*      (2006.01)
    *B23K 103/10*      (2006.01)

(52) U.S. Cl.
    CPC .......... *B23K 20/22* (2013.01); *B23K 2103/04* (2018.08); *B23K 2103/10* (2018.08)

(58) Field of Classification Search
    USPC ........................................................ 700/160
    See application file for complete search history.

(56)                   References Cited

U.S. PATENT DOCUMENTS

| | | | |
|---|---|---|---|
| 5,558,265 | A | 9/1996 | Fix, Jr. |
| 5,699,952 | A | 12/1997 | Fix, Jr. |
| 5,923,558 | A | 7/1999 | Fix, Jr. |
| 5,927,910 | A | 7/1999 | Fix, Jr. |
| 6,095,395 | A | 8/2000 | Fix, Jr. |
| 7,494,040 | B2 * | 2/2009 | Babb .................... B23K 20/227 228/2.1 |
| 7,770,777 | B2 | 8/2010 | Miller |
| 8,796,586 | B2 * | 8/2014 | Fulcer ..................... B23K 9/32 219/136 |
| 9,211,606 | B2 * | 12/2015 | Tiberghien .......... B23K 11/315 |
| 10,041,163 | B1 * | 8/2018 | Offer ......................... C23C 4/01 |
| 2007/0164081 | A1 | 7/2007 | Miller |
| 2008/0093420 | A1 | 4/2008 | Mauer |
| 2024/0001477 | A1 * | 1/2024 | Griffin ............... B23K 20/1295 |

FOREIGN PATENT DOCUMENTS

| | | | | |
|---|---|---|---|---|
| EP | 0235879 | A1 | 9/1987 | |
| EP | 1776205 | B1 | 3/2011 | |
| FR | 3046096 | A1 | 6/2017 | |
| IN | 202141039127 | A * | 9/2021 | |
| JP | 2005007416 | A * | 1/2005 | |
| WO | WO-9521040 | A2 * | 8/1995 | ......... B23K 20/1285 |
| WO | WO-9748518 | A2 * | 12/1997 | ......... B23K 20/1285 |
| WO | WO-2011021456 | A1 * | 2/2011 | ......... B23K 11/0053 |
| WO | WO-2015146185 | A1 * | 10/2015 | ......... B23K 20/1255 |

OTHER PUBLICATIONS

Written Opinion for International Application PCT/US2020/019483 mailed Jul. 2, 2020.
Young, Underwater Friction Stud Welding System—One Step Closer to the Fleet. Faceplatee—The Official Newsletter for the Divers and Salvors of the United States Navy, (con't) vol. 11, No. 1, p. 3 (Apr. 2007). Describes commercialization of prior FIX model FBS 2000. The Fusion Bonding System Operation Manual. prepared by Fusematic Corporation of Palm City, Florida. (Mar. 2, 2001). Entire document as describes commerialization FBS 2000.
(Non-published) Jacobs, of Lousina, USA work product for Fusematic reverse engineering FAS 2000 commercial applicaation ~ 2002. MPEP Con't . . . 724 submission mailed into this application Jun. 30, 2025.
(Non-published) Jack Fix of Florida, USA, assortment of FBS 2000 manufacturing drawings related to commercialization of that model . . . Con't . . . cira ~ 2002, MPEP 724 submission mailed into tis application Jun. 30, 2025.
Gibson, Dave; Friction Stud Welding Underwater in the Offshore Oil and Gas Industry, International Workshop on the State of th Art Science and Reliablity of Underwater . . . Welding and Inspection Technology (Nov. 17-18, 2010), pp. 91-102, Published by ABS of Houston, Texas, USA . . . Whole doc. See, particularly, reference to development work relating to "friction surfacing" of Aluminum underwater, pp. 100-101 and shroud p. 97.
Couch, Jack, W; Friction Stud Welding Testin for Submarine Rescue; International Workshop on the State of th Art Science and Reliablity of Underwater . . . Welding and Inspection Technology (Nov. 17-18, 2010), pp. 84-190, Published by ABS of Houston, Texas, USA . . . See generally whole doc.

* cited by examiner

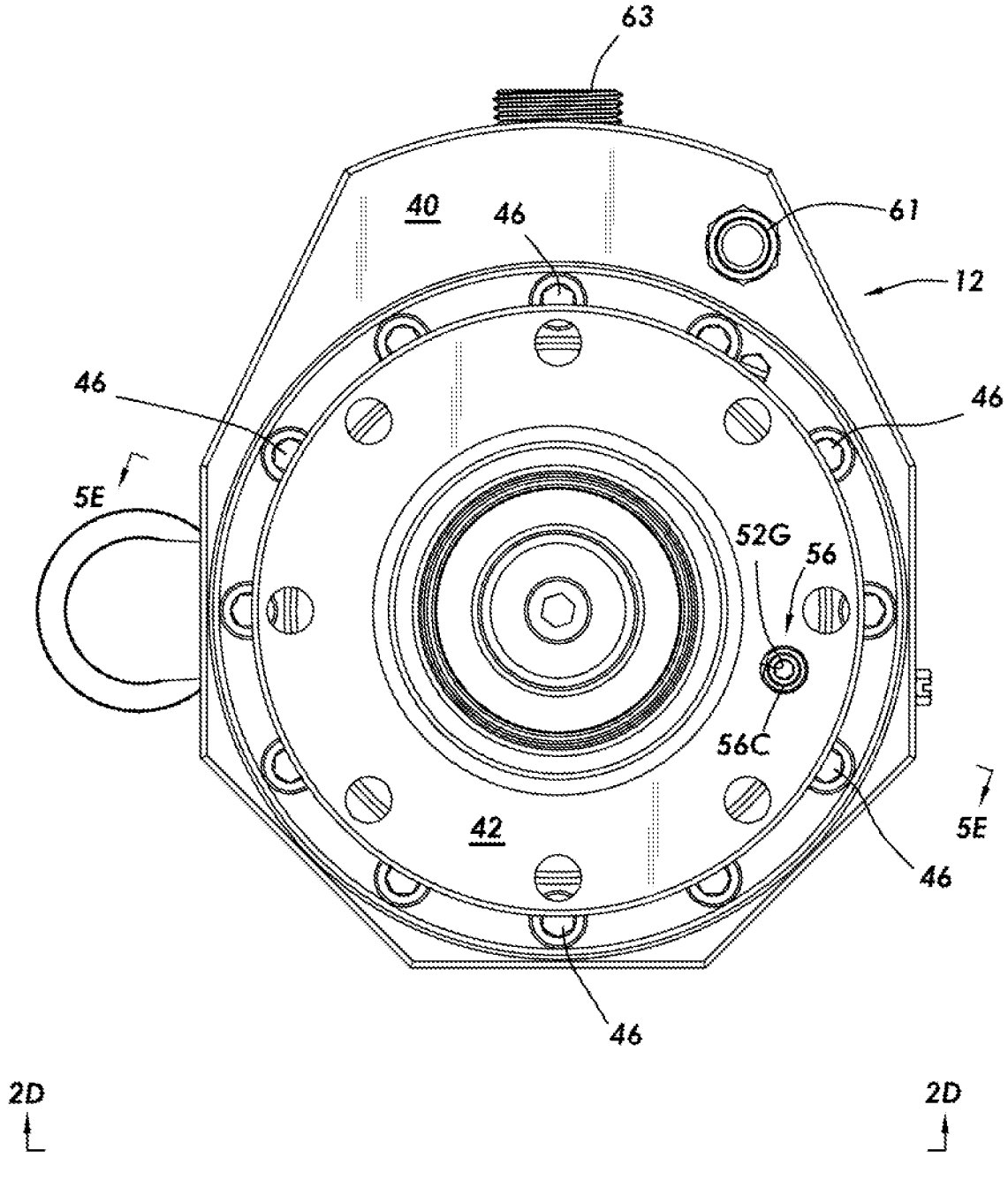
$F$IG.2B

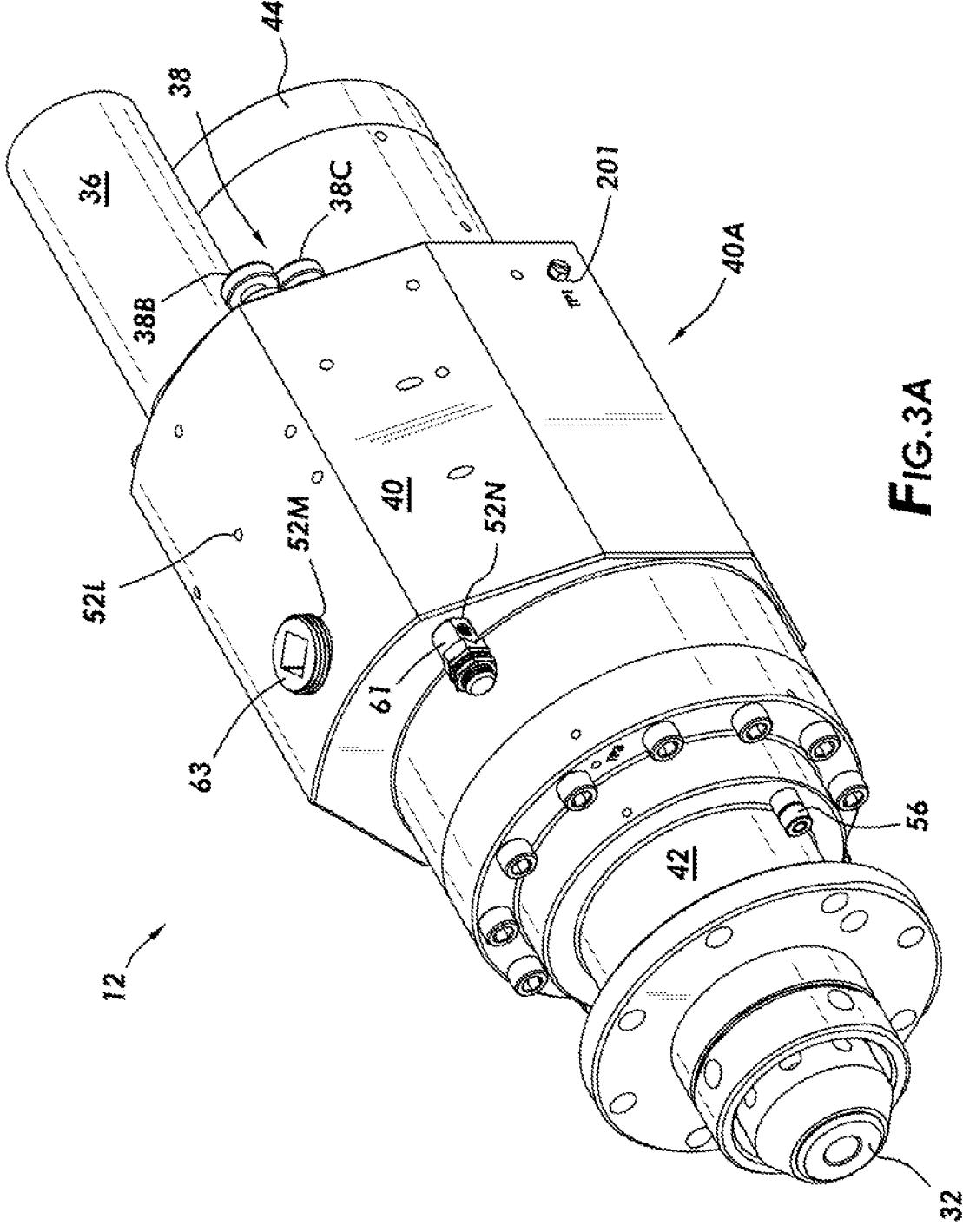
*F*IG.3A

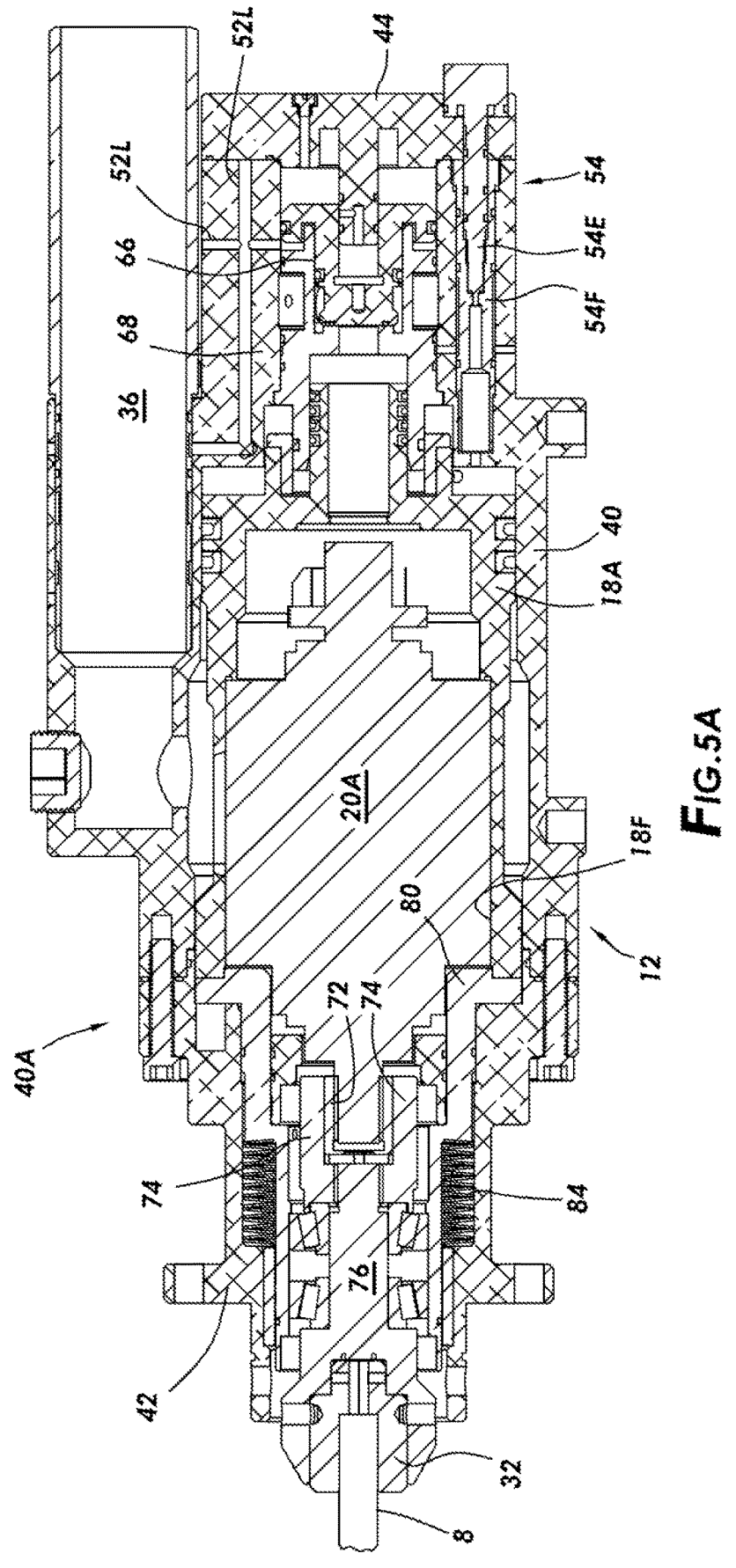
*F*IG.5A

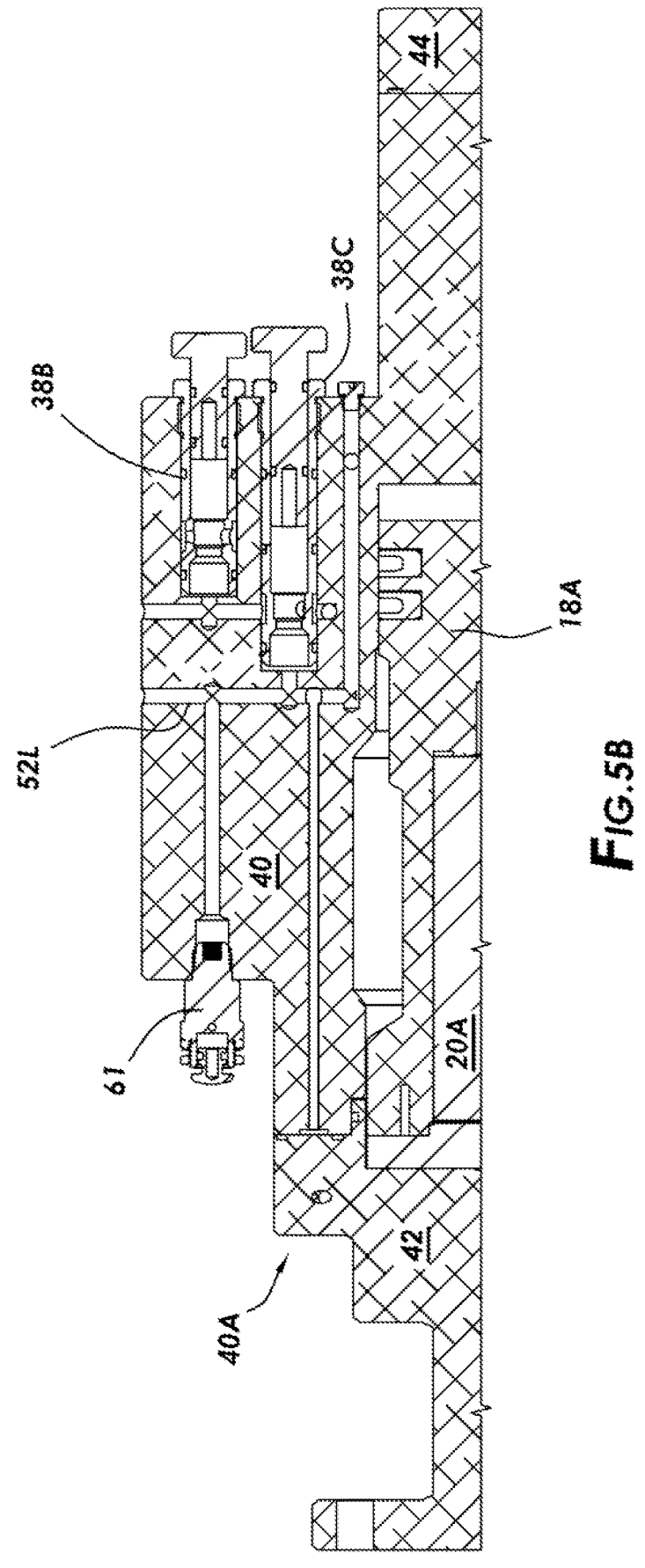
*F*IG.5B

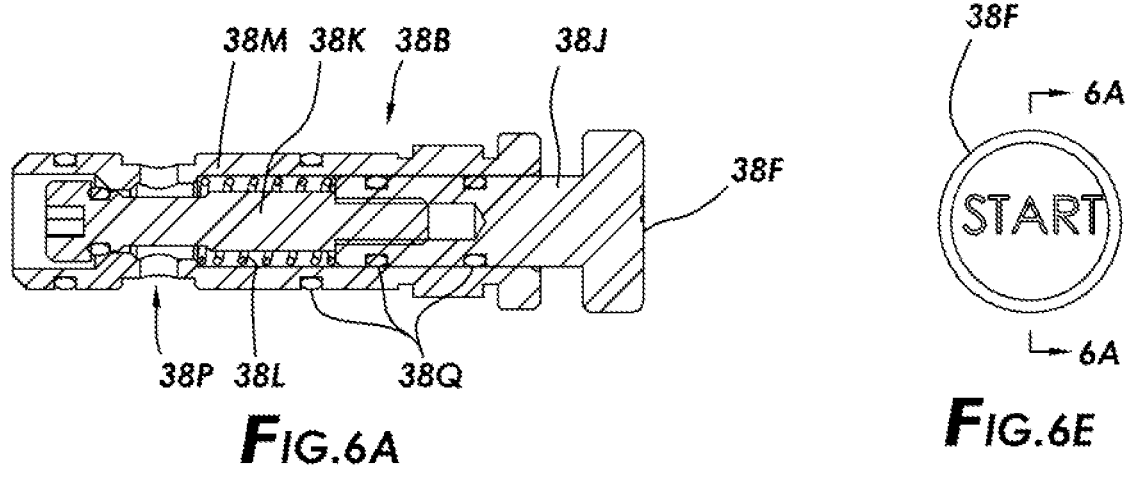
38M  38K  38B     38J
38F
38P  38L     38Q
*F*IG.6A
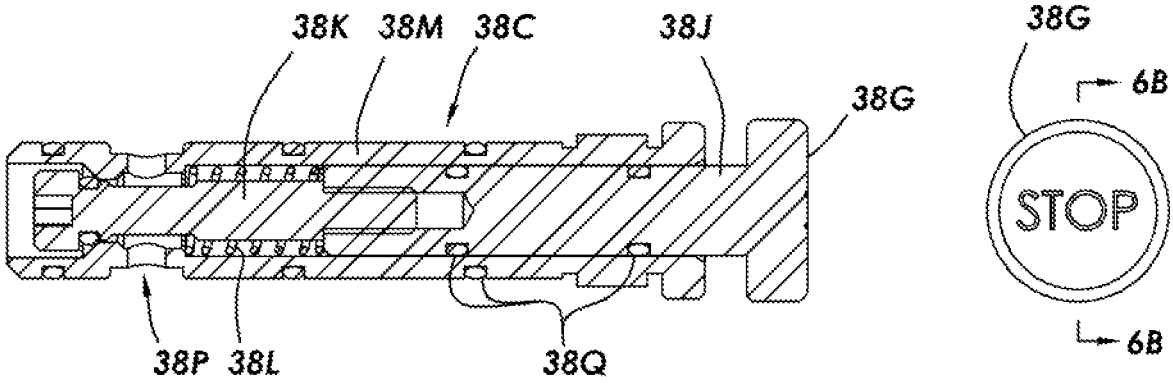
38K  38M  38C     38J
38G
38P  38L     38Q
*F*IG.6B
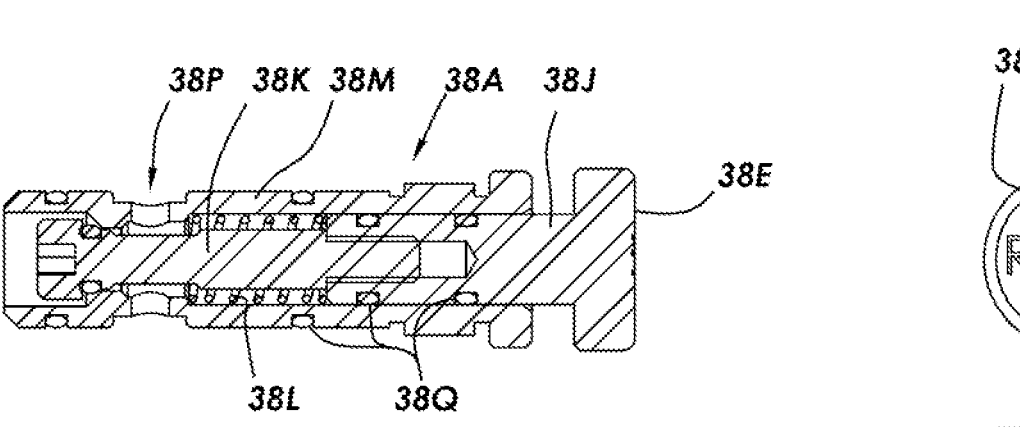
38P  38K  38M  38A  38J
38E
38L     38Q
*F*IG.6C
38F
→ 6A
START
↳ 6A
*F*IG.6E
38G
→ 6B
STOP
↳ 6B
*F*IG.6F
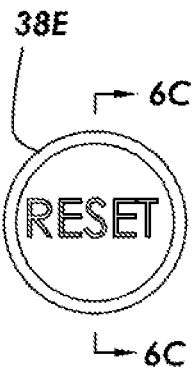
38E
→ 6C
RESET
↳ 6C
*F*IG.6D

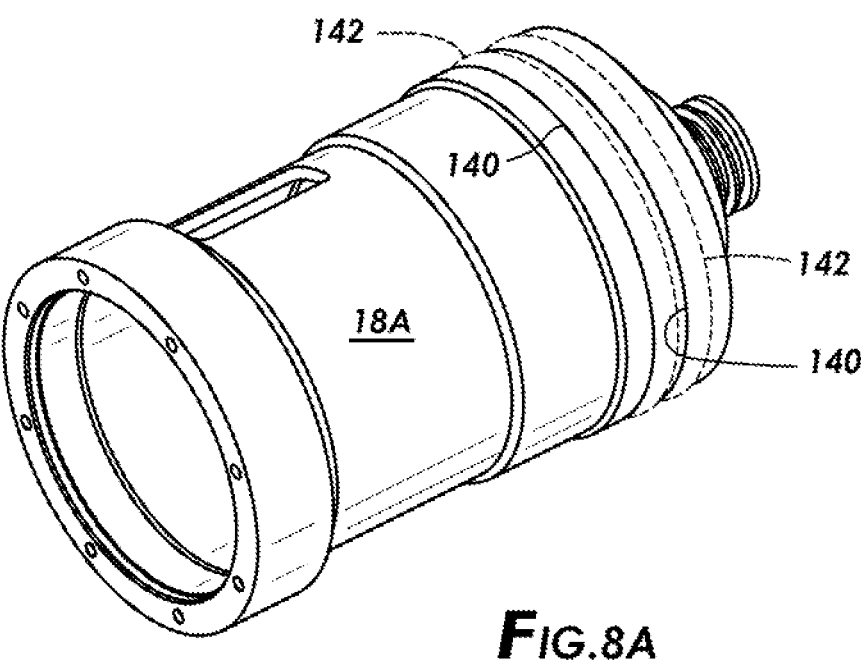
*F*IG.8A
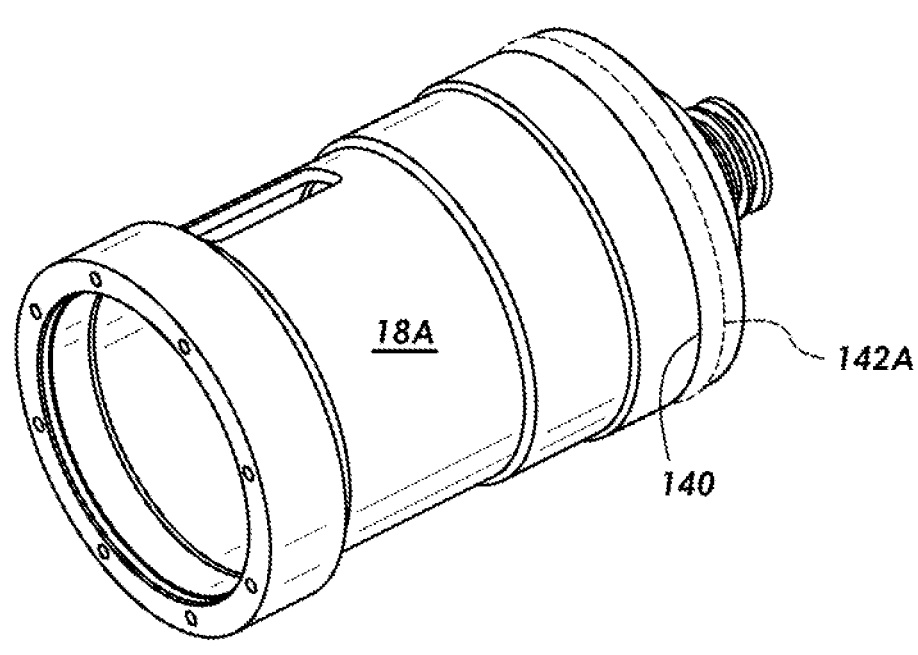
*F*IG.8B

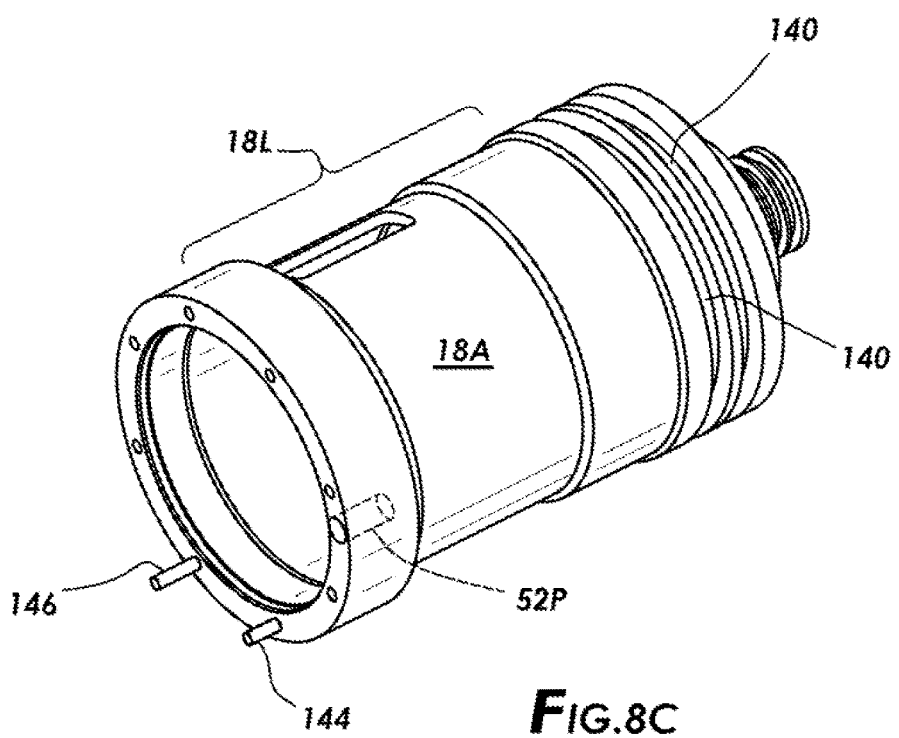
*F*IG.8C
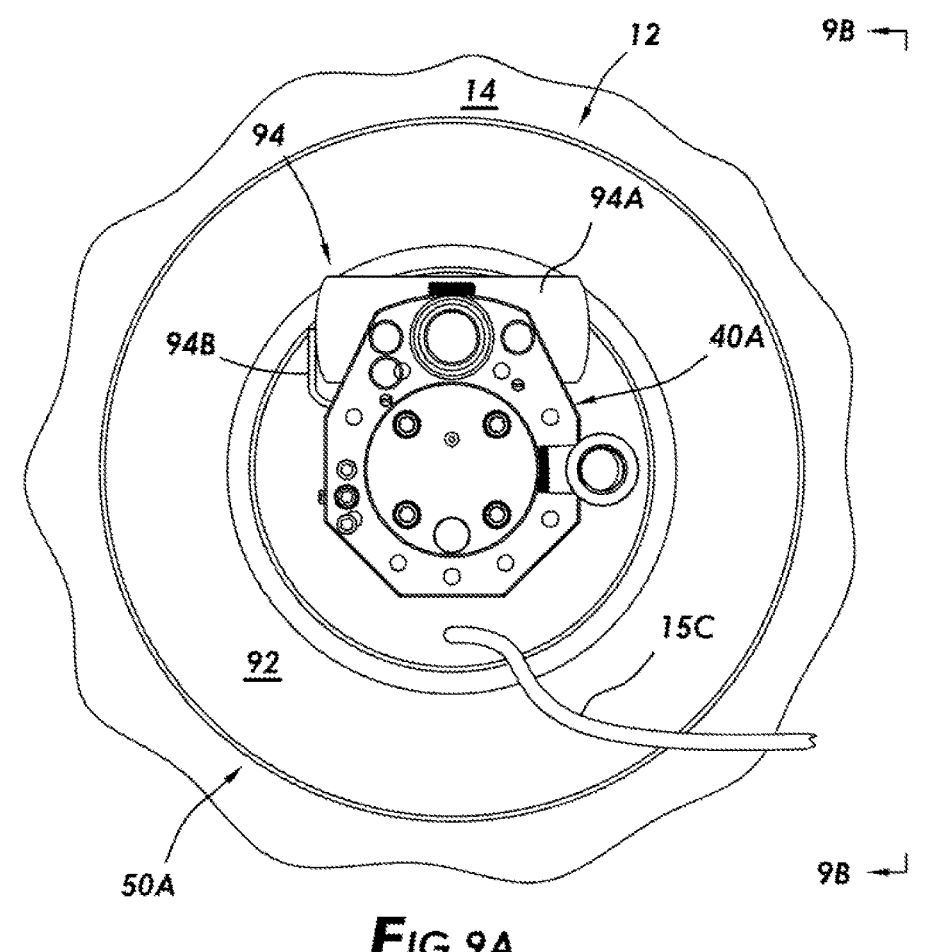
*F*IG.9A

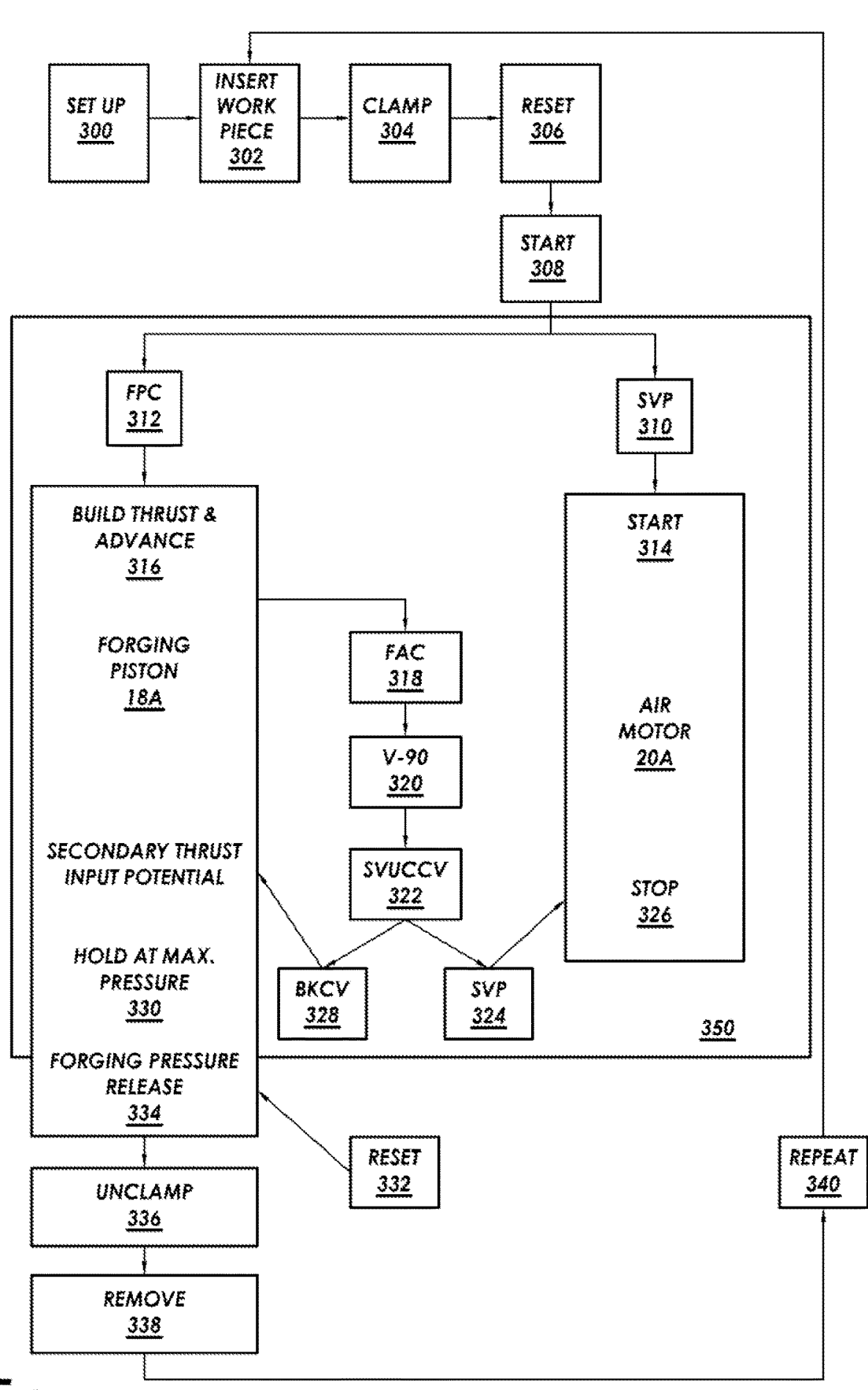
FIG.11A

AUTOMATED PORTABLE FRICTION WELDING SYSTEM AND METHOD OF OPERATION

RELATED APPLICATION

This application is a national phase entry under 35 USC 371 of International Patent Application No.: PCT/US2020/019483 filed 24 Feb. 2020.

This application claims the benefits of the filing date of provisional application Ser. No. 62/809,825, filed by Fix et al on Feb. 25, 2019 for An Improved Automated Portable Friction Welding System and Method of Operation, the full disclosure of which is hereby incorporated by reference.

BACKGROUND OF THE INVENTION

The present invention relates to a system, method and components for joining a workpiece to a substrate, and more particularly, to a portable friction welding system, its components, method of operation and application.

The present invention supports installation, fabrication and repair operations relying on the installation of fastening elements to a substrate. Such fastening elements (also called workpieces, fittings or fixtures) include, for example, externally threaded studs, internally threaded bosses, bolts and other fittings for which installation operations have been dominated by conventional mechanical means, legacy/conventional welding techniques and explosive/electrical discharge means. For instance, some methods for attaching fastening components involve placing bolts through drilled holes. Others place a stud in a tapped hole. Still other methods include legacy welding in an attempt to form a strong, cohesive, high strength, fine grain weld bond. Typically, this might be attempted through arc welding, oxyfuel gas welding, flash welding, brazing, soldering, electron beam welding, or laser beam welding techniques.

However, drilling and tapping takes time, and in many cases, it is not possible to drill through a substrate. Aligning pre-drilled holes may cause problems. In many common welding applications, the exposed flame, arc or electrical discharge creates a hazard/ignition and may not be practical to use. For example, in areas where combustible gases are present, it is not usually possible to use an open flame or arc welding procedure due to the inherent danger of fire or explosion. Further, the heat generated through such processes may lead to a loss of structural integrity in the bond or adjacent material and may compromise coatings and liners on both the face and back side of the substrate. And material compatibility is another area of concern, e.g., in materials that are difficult themselves or in material combinations that are problematic. Examples include challenges welding in stainless steel or aluminum, stainless steel to aluminum or in combinations of stainless steel to carbon steel. While some of these can be tackled on occasion by those of highly specialized skill, much of this remains a difficult area frequently subject to inconsistent and unsatisfactory results at the hands of the common skill levels that are readily available in the generally welding trade applying other tools and methods.

There have been limited attempts to address the need for a versatile tool that can provide efficient, consistent, high quality welds with portable friction welding systems. Broadly, friction welding is a process for joining materials using a combination of pressure and movement at the interface of a workpiece to be joined and a substrate. Friction induces very localized heating from rotating a workpiece held against a substrate to which it is being joined. After the material at this intersection has plasticized, rotation stops and forging pressure holds the workpiece against the substrate until the localized plasticized material fully solidifies and the weld is complete. However, the success of these tools has been limited by excessive reliance on highly specialized skilled labor. Further improvements in automating the use of portable friction welding systems have been required to extend the ability to provide efficient, consistent, high quality welds with portable friction welding systems to tradesmen requiring less, more modest specialized training over that which defines ordinary skill in the welding arts.

And more specific examples can greatly benefit from practice of the present invention. A particularly advantageous application of the present technology is to weld aluminum or stainless steel to aluminum substrates. Ship building and other maritime and offshore applications value the benefits of aluminum in resisting corrosion. And while some electrical discharge welding techniques have been developed that can work in a dry environment, they are not suitable for underwater application. Thus, even as more and more ferries, patrol boats, naval and maritime vessels are using aluminum hulls, the ability to weld underwater with workpieces and substrates in aluminum alloys such as the 5000 or 6000 series or with stainless steel workpieces such as the 300 series to aluminum substrates has remained a daunting a challenge, one understood in the industry to severely limit the feasibility of conducting installation and repair procedures in the field below the waterline.

Therefore, there remains a substantial need for an improved portable welding system, tool and method to more broadly and successfully bring the benefits of portable friction welding to industry.

BRIEF SUMMARY OF THE INVENTION

To achieve these and other advantages in accordance with the purposes of the present invention, as embodied and broadly described herein, the present invention relates, in part, to an automated portable friction welding system for friction welding a workpiece onto a substrate. This system comprises a power system selected from one or more of a group comprising pneumatic power, hydraulic power and electrical power and operably connects the power system to a portable friction welding tool which comprises a tool housing having a longitudinal axis, an actuator received in an axially slidable relation within the tool housing and a rotary motor disposed in the tool housing and engaged to said actuator to slide therewith. Further, the system comprises a collet configured to receive the workpiece and a transmission or drive train within the tool housing connecting the motor to the collet. Other aspects of this claimed embodiment comprise a start input and an automated control system which comprises a motor control system operably connected and to a power source and responsive to a signal from the start input to cause the motor to spin the workpiece, a first axial thrust control system operably connected to the start input and disposed to begin a first input to the thrust building cycle acting upon the actuator upon receipt of the signal from the start input, an upset phase control system responsive to axially sliding of the actuator whereby the end of the desired actuator stroke operates to cut the motor off and to initiate and then hold a second potential input to the axial thrust cycle acting on the actuator and therethrough to the interface of the workpiece and substrate. And a reset input is operable to release the thrust in the actuator at the end of a cool down phase.

Another feature of some embodiments of the present invention is a versatile, automated friction welding tool for receiving power from a power source and friction welding a potential range of workpieces onto any of a range of potential substrates. The tool comprises a tool housing having a longitudinal axis; an actuator axially slidably received within the tool housing; a rotary motor disposed in the tool housing and engaged to said actuator to slide therewith; a collet configured to receive the workpiece; and a transmission or drive train within the tool housing connecting the motor to the collet. The tool further comprises a start input; an automated control system comprising a motor control system operably connected to the power source and responsive to a signal from the start input cause the motor to spin the workpiece; a first input to the axial thrust control system operably connected to the power source and the start input and disposed to begin a an adjustable first thrust building cycle acting upon the actuator upon receipt of the signal from the start input; an upset phase control system responsive to axially sliding of the actuator whereby the end of the desired actuator stroke operates to cut the motor off and to potentially initiate the contribution of a second input to the axial thrust cycle acting on the actuator and to hold the thrust or forging force therethrough acting at the interface of the workpiece and substrate; and a reset input operable to release the thrust in the actuator at the end of a cool down phase.

A further feature of the present invention addresses a method for automating a versatile friction welding process for friction welding a variety of workpiece/substrate combinations using a portable friction welding system. A workpiece is installed into a collet of a portable friction welding tool and the workpiece is positioned at the weld site and a tool housing of the portable friction welding tool is secured to the substrate. An automated friction weld cycle is initiated beginning with a burn off phase, comprising engaging a rotary drive to rapidly spin the workpiece about a longitudinal axis and engaging a first component of the thrust cycle which progressively builds axial force driving the workpiece against the substrate at the weld site. This rapid spinning and axial thrust of the workpiece against the substrate combine to frictionally heat a localized segment of the weld site. An upset phase is initiated in the automated friction weld cycle, comprising plasticizing localized heated material at the weld site and axially translating the workpiece into the substrate at the weld site. The upset phase transition to a cool down phase uses a control instruction responsive to an adjustable amount of axial translation of the workpiece to disengage the rotary drive to stop spinning the workpiece about its longitudinal axis and uses the control instruction to potentially engage a second component of the axial thrust component acting on the workpiece to advance the workpiece to a final weld position and maintain force pressing the workpiece into the substrate at the weld site for the cool down phase. No second component is provided if the first thrust component has achieved full levels. After the cool down phase, the workpiece is released from the collet which is withdrawn away from the substrate. The portable friction welding tool is then available for repeating operations at other locations on the substrate, if desired.

Yet other embodiments for practicing a portable friction welding operation addresses a method for welding an aluminum workpiece to an aluminum substrate in an underwater environment. A workpiece is installed into a collet of the portable friction welding tool and a housing of the portable friction welding tool is clamped to the substrate. A burn-off phase is initiated comprising engaging a rotary drive to rapidly spin the aluminum workpiece about a longitudinal axis and engaging a first component of the thrust cycle which progressively builds axial force driving the aluminum workpiece against the aluminum substrate at the weld site. The rapid spinning and axial thrust of the aluminum workpiece against the aluminum substrate combine to frictionally heat a localized segment of the weld site in a burn-off phase. An upset phase is initiated in the automated friction weld cycle, comprising plasticizing localized heated material at the weld site and axially translating the workpiece into the substrate at the weld site. The rotary drive is disengaged to stop spinning the aluminum workpiece about its longitudinal axis and a cool down phase is initiated whereby the weld is allowed to fully solidify while holding thrust across the weld and allowing the weld to fully solidify. After cool down, the workpiece is released from the collet which is withdrawn away from the substrate and the clamp releases the portable friction welding tool from engagement with the substrate.

Additional features and advantages of the present invention will be set forth, in part, in the description that follows and, in part, will be apparent upon study of the description or can be learned by practice of the invention. The features and other advantages of the present invention will be realized by means of the elements and combinations particularly pointed out in the description and in the claims.

It is to be understood that both the foregoing general description and the following detailed description are exemplary and explanatory only and are intended to provide a further explanation of the present invention, as claimed.

BRIEF DESCRIPTION OF THE DRAWINGS

The accompanying drawings, which are incorporated in and constitute a part of this application, illustrate features in various embodiments of the present invention and, together with the description, serve to explain the principles of the present invention. In different figures various features are designated with identical reference numerals and related items are often designated with the same reference and with a letter suffix appended.

FIG. 20 is a bottom elevational view of the portable friction welding tool of FIG. 2A taken at line 20-2D in FIG. 2B;

FIG. 3A is a perspective front/top/right (from the front) side of view of the portable friction welding tool of FIG. 2A;

FIG. 5A is a longitudinal cross-section bisecting an assembled portable friction welding tool taken along line 5A-5A in FIG. 2C;

FIG. 5A is a longitudinal cross-section bisecting an assembled portable friction welding tool taken along line 5A-5A in FIG. 2C;

FIG. 5B is a partial longitudinal cross-section bisecting start and stop valves within an assembled portable friction welding tool taken along line 5B-5B in FIG. 2C:

FIG. 6A is a close up longitudinal cross-sectional view of the start valve assembly of FIG. 5B taken at line 6A-6A of FIG. 6E;

FIG. 6B is a close up longitudinal cross-sectional view of the stop valve assembly of FIG. 5B taken at line 6B-6B of FIG. 6F;

FIG. 6C is a close up longitudinal cross-sectional view of the reset valve assembly of FIG. 5D taken at line 6C-6C of FIG. 6D;

FIG. 6D is an end view of reset valve of FIG. 5D;

FIG. 6E is an end view of the start valve set out in FIG. 5B;

FIG. 6F is an end view of the stop valve set out in FIG. 5B;

FIG. 8A is a close-up perspective view of the forging piston of FIG. 4;

FIG. 8B is a close-up perspective view of an alternate embodiment of the forging piston of FIG. 8A for a portable friction welding tool in accordance with an embodiment of the present invention;

FIG. 8C is a close-up perspective view of another alternate embodiment of the forging piston of FIG. 8A for a portable friction welding tool in accordance with an embodiment of the present invention;

FIG. 9A is a back elevational overview of the portable friction welding tool embodiment of FIG. 2A in an application attached to one embodiment of a vacuum clamp;

FIG. 11A is a flow diagram of one embodiment presenting a combination of operational steps in using the portable friction welding system in conjunction with the automated inner working of the tool;

DETAILED DESCRIPTION OF THE INVENTION

It is to be understood that the apparatus and methods described herein may be implemented in various forms and those skilled at the art should appreciate that they can readily use the disclosed conception and specific embodiments as a basis for designing or modifying other structures for carrying out the same purposes of the present invention as defined by the patent claims. The detailed description describes several distinct embodiments and it will be understood that not all of that detail, while exemplary, is essential to the claimed invention. Thus, other modifications, changes and substitutions are intended to the foregoing disclosure and, in some instances, some features of the invention will be employed without a corresponding use of other features. Accordingly, it is appropriate for the patent claims be construed broadly and in a manner consistent with the spirit and scope of the invention herein.

Figure 1A:
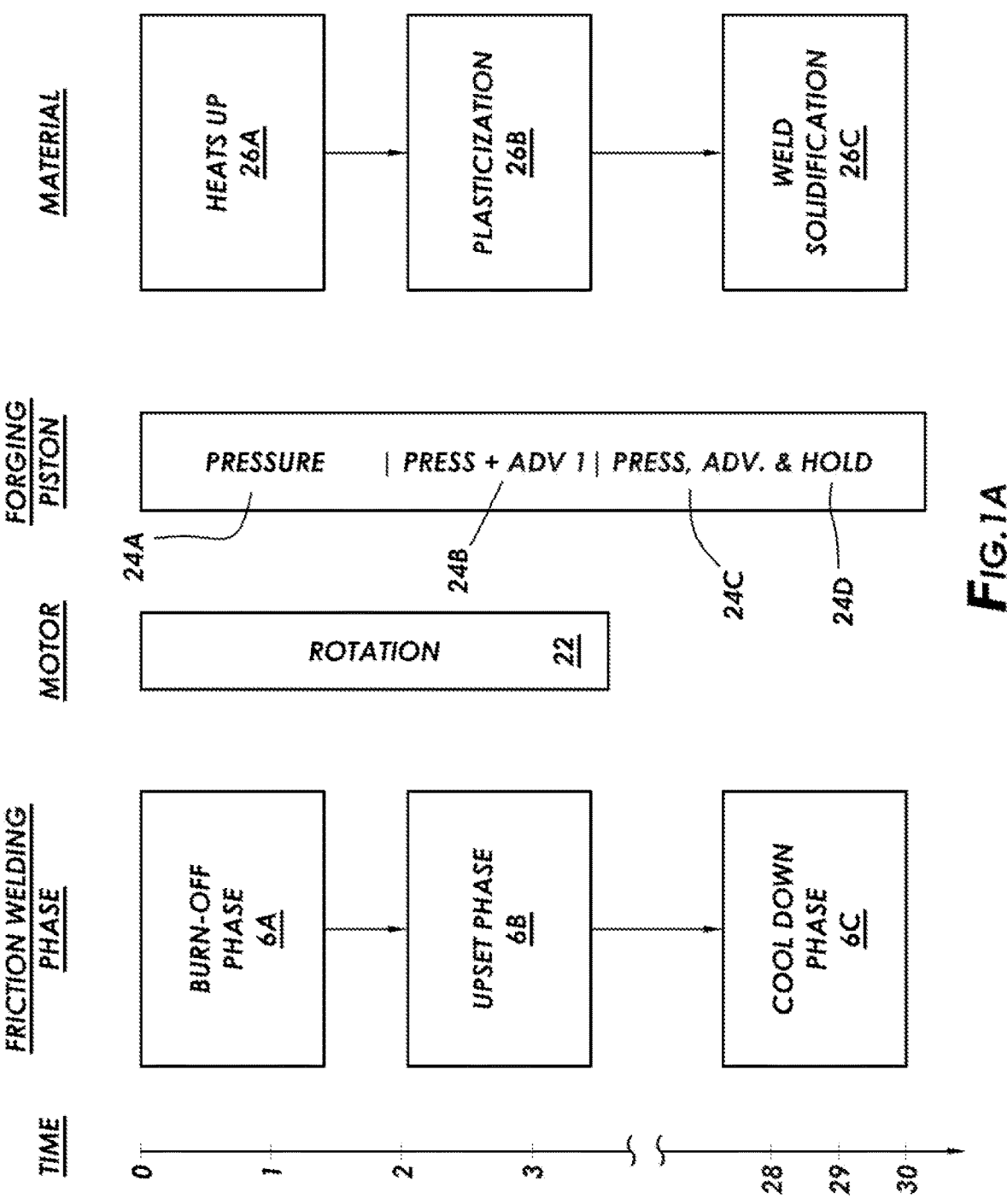
FIG. 1A is a timeline and block diagram of an embodiment of the present invention in broad, basic functional aspects of a friction welding system.

Friction welding processes have been in use in factory settings for decades in extremely large, heavy bed lathe machines. More recently, portable friction welding devices have been developed to allow friction welding deployment in the field. FIG. 1A provides a rough timeline for welding with a portable friction welding system. This timeline correlates the friction welding stage with what is happening in the motor, the forging piston and in the materials to be joined, respectively. Friction welding has three stages, a burn off phase 6A, and upset phase 6B and a fusion or cool down phase 6C. In the burn off phase, the motor provides rotation 22 to the workpiece and, in pneumatic and hydraulic systems, pressure 24A builds in the forge piston to provide thrust forcing the rotating workpiece against the substrate such that the friction produces substantial localized heat at the intersection of the workpiece and the substrate, see stage 26A for the material. Rotation 22 in the motor continues in upset phase 6C and further force in the forging piston begins to cause advancement 24B of the workpiece into the substrate as the materials at the intersection plasticize, see step 26B for the material. In an embodiment of the automatic portable friction welding of the present invention, advancement of the forging piston 24B turns off rotation 22 from the motor and creates the potential for a thrust boost 24D in the forging piston, if needed, as the friction welding process enters cool down phase 6C and the weld material joining the workpiece and the substrate solidifies 26C. Forging pressure 24C is maintained throughout the cool down phase 6C. The automated cycle typically takes two to four seconds and ceases when the motor cuts off, rotation 22 ceases and the second stage thrust 24C has been applied, if any. A manual wait time on the order of twenty to thirty seconds in most circumstances completes the cool down phase 6C and weld solidification 26C and the thrust can be released and the tool removed from the installed workpiece.

Figure 1B:
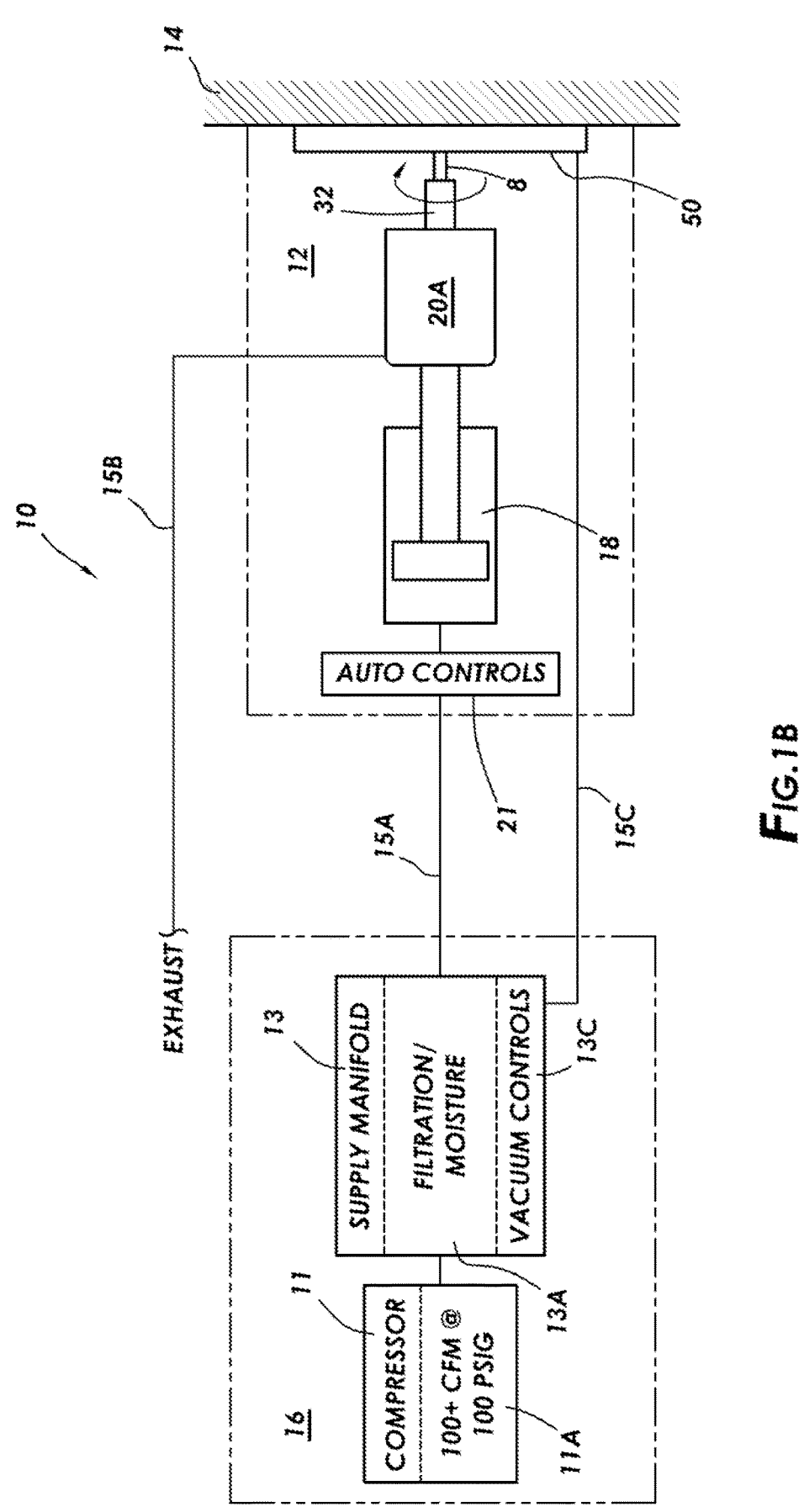
FIG. 1B as a schematic representation of one embodiment of a portable friction welding system in accordance with the present invention.

FIG. 1B is a schematic representation of major components of one embodiment of a portable friction welding system 10 for bonding a first element, fixture or workpiece 8 (most often in the form of an externally threaded stud or an internally threaded boss) to a substrate 14. In this illustrative embodiment, system 10, the power source is a pneumatic system in which an air supply is provided by a compressor 11 having a regulator 11A and is connected to a supply manifold 13. The supply manifold has air quality provisions 13A to filter and remove moisture. Air pressure from the supply manifold is conducted to portable friction welding tool 12 through an air supply line 15A. In this embodiment of tool 12, the actuator is in the form of a forging piston 18 and the air supply provides both a forging pressure and translation of the actuator and drives a motor 20 to import rotary motion to first element 8 through a collet 32 before exhausting through exhaust line 15B. In applications where portable friction welding tool 12 is deployed underwater, components of air supply 16 will typically be provided as topside equipment and connected to tool 12 through a bundled umbilical of air supply line 15A, exhaust line 15B and, if the clamp calls for it, vacuum line 15C. Bringing the exhaust to the surface allows a single pressure system and mitigates the chance of water intrusion into the portable friction welding tool. This provides for a more dependable tool and mitigates maintenance requirements. Underwater applications will also be facilitated by adding buoyancy provisions to the portable friction welding tool to make for easier diver handling and to render the umbilical of bundled flowlines substantially neutrally buoyant.

Clamp 50 facilitates holding forging pressure and resisting torque at the interface of workpiece 8 and substrate 14 during the friction welding process. Clamp 50 may be in any form, including, but not limited to, a mechanical connection such as a "c" clamp or a chain clamp or, as provided here, a vacuum clamp which is connected to a vacuum feed off compressor 11 through vacuum controls 13C of supply manifold 13 through vacuum line 15C.

Effective and automated control over the friction welding operation is an important feature of the portable friction welding tool. For the purposes of clarity, control features were omitted from the schematic of mechanical elements in FIG. 1B. However, these aspects are introduced in connection with the functional map of FIG. 1C.

Figure 1C:
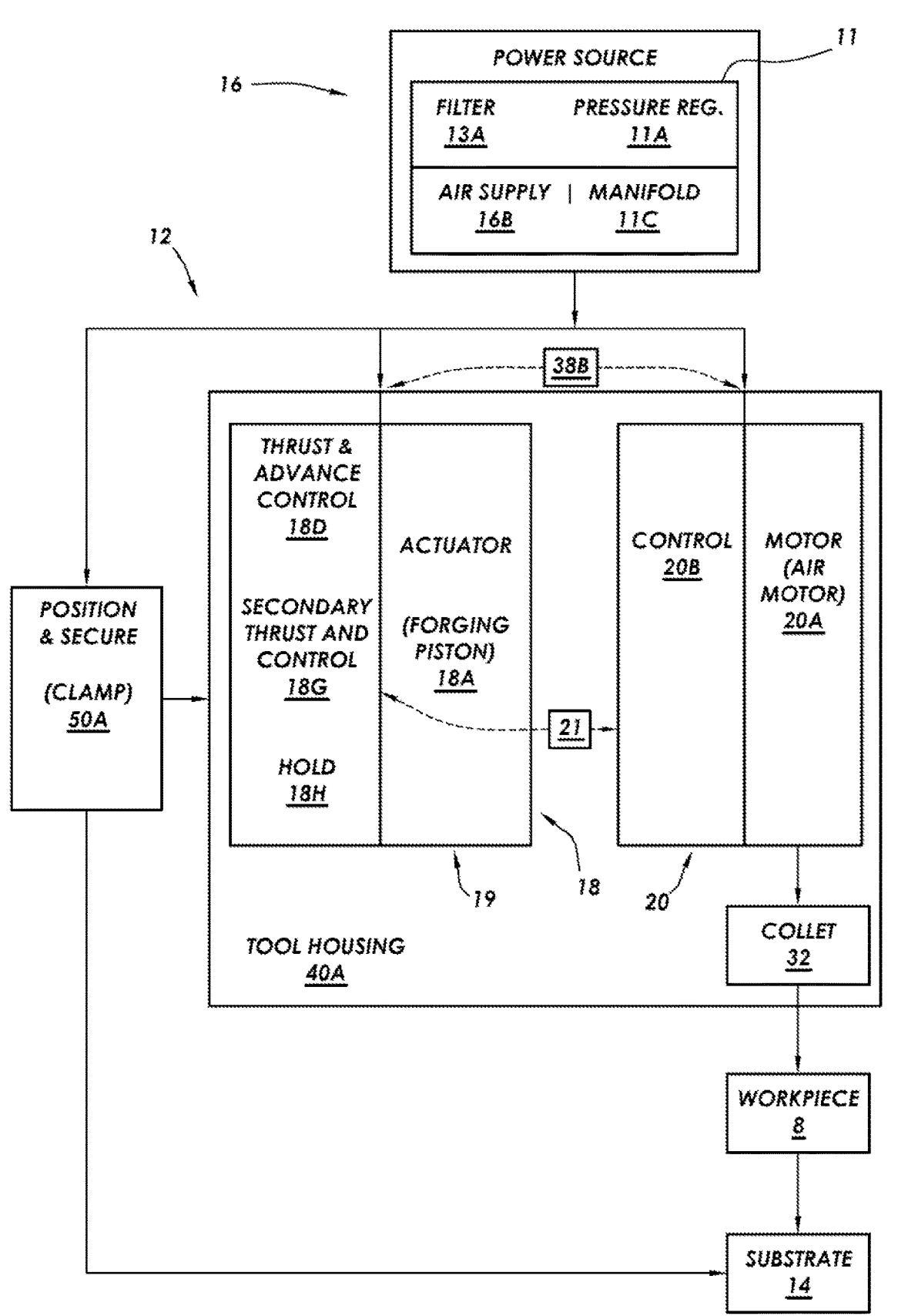
FIG. 1C is a block diagram of functional aspects of a portable friction welding system in accordance with an embodiment of the present invention.

Referring to FIG. 1C, the "remote" power source 16 may be pneumatic, hydraulic or electrical in nature (or a combination thereof) to drive a motor system 20 and an actuator 19. For this illustrative example, the power supply 16 is an air compressor 11 having a pressure regulator 11A, titter 13A, and a manifold 11C presenting air supply 16B. The air supply interacts with drive and automatic control systems 20B that serves motor system 20C (here an air motor) and control and drives systems for an actuator 19, here forging piston system 18, through controlling drivers 18D and 18G, Motor system 20 including air motor 20A and motor control provisions 20B, impart rotation of workpiece 8 (See FIG. 1B). An operator pushing start button 38D instructs motor control assembly 206 to turn air motor 20A on and instructs thrust control 18D to begin building forging pressure acting on forging piston 18A to produce thrust and then advance forging piston 18A. Automatic shutdown 21 is triggered by translation of forging piston 18A which causes a signal for secondary thrust input 18G and motor shut off 20C. An enhanced secondary thrust component is available if necessary, through controls 18G. This contribution of secondary thrust can be mild or even non-existent if the full forging force required from the forging piston has already been reached through initial thrust control 11D. And this forging pressure is held, step 18H, throughout the cooldown period. This secondary input contribution can be mild or even non-existent if the full required pressure on the forging piston has already built through initial thrust control 18D. Thus, the actuator/forging piston system 18 acts upon air motor system 20, and therethrough (see FIG. 1B) to collet 32 and to workpiece 8 as it engages substrate 14 during friction welding, applying a controlled amount of thrust, over a proscribed time, to accomplish the bonding.

Function map 1C also includes the function of positioning and securing tool housing 40A of the portable friction welding tool to substrate 14 with clamp system 50A. In this embodiment, clamp system 50A is a vacuum system driven through a vacuum line 15C from manifold 11C.

The hardware of an illustrative embodiment of the present invention is addressed in FIGS. 2-9. FIGS. 2A-2F present elevational views of an illustrative embodiment of portable friction welding tool 12. It will be appreciated that the tool may be used in many orientations, e.g. to attach members from beneath a horizontal substrate surface (such as for repair to the bottom of a ship's hull), from beside a vertically oriented substrate surface (such as to mount equipment or repair a vertical wall of a tank or vessel), or from over a substrate surface (such as installation onto a deck or a repair to the top of a tank). However for the purpose of clarity, orientation of the tool will be described herein with the portable friction welding tool with its longitudinal axis of main housing 40 and front housing 42 in a horizontal position and with the "forward" end presenting collet 32 and the "back end" presenting a housing end plate 44, an air supply inlet 35, exhaust nozzle 36, and operator controls 38. From this orientation, FIG. 2A-2F are views of the top, front, back, bottom, right side (viewed from the operator's perspective, behind the tool) and the left side, respectively, of these same components.

Figure 2A:
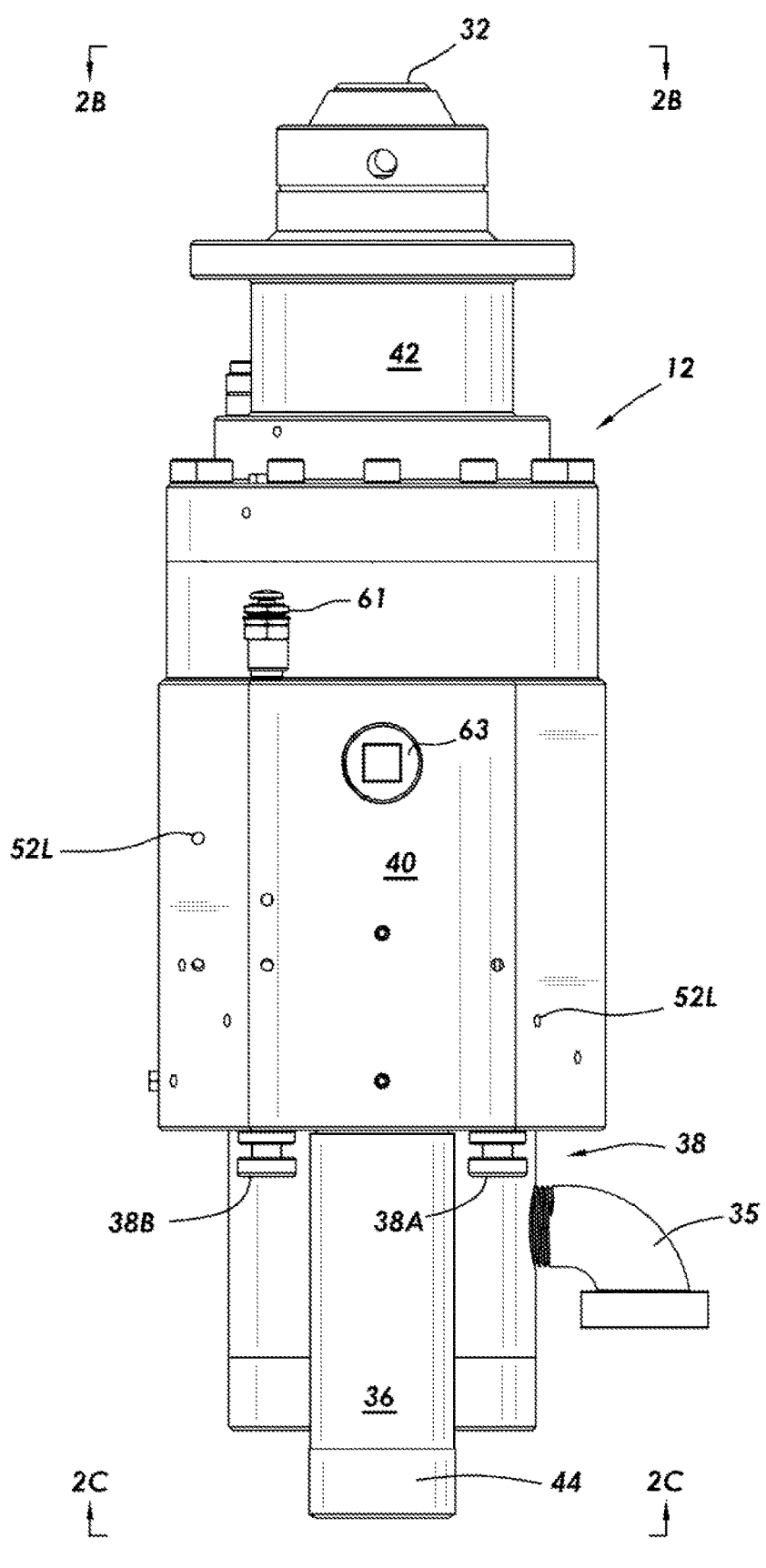
FIG. 2A is a top elevational view of one embodiment of a portable friction welding tool in accordance with the present invention.
Figure 2C:
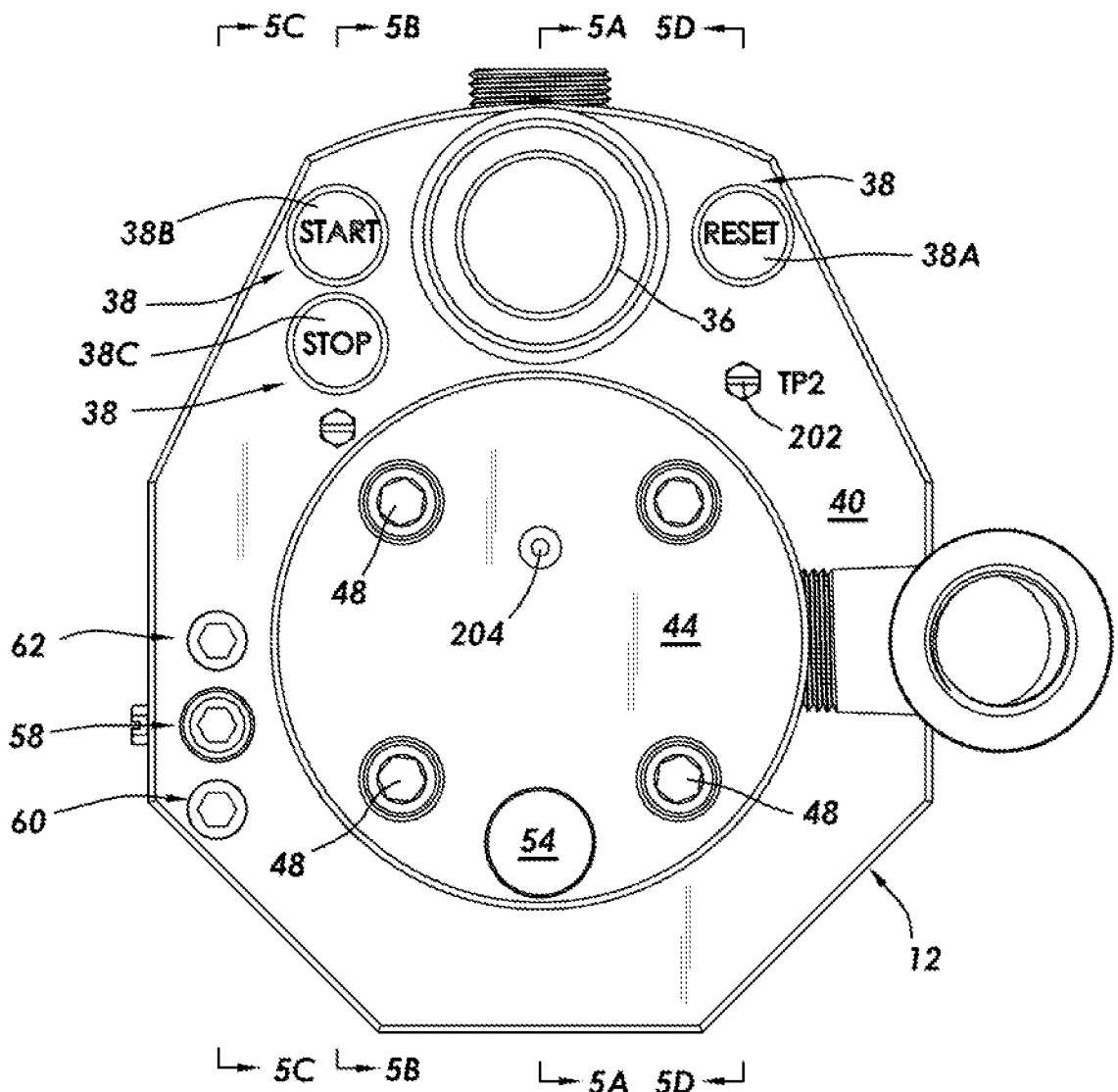
FIG. 2C is a back elevational view of the portable friction welding tool of FIG. 2A taken at line 2C-2C in FIG. 2A.
Figure 2D:
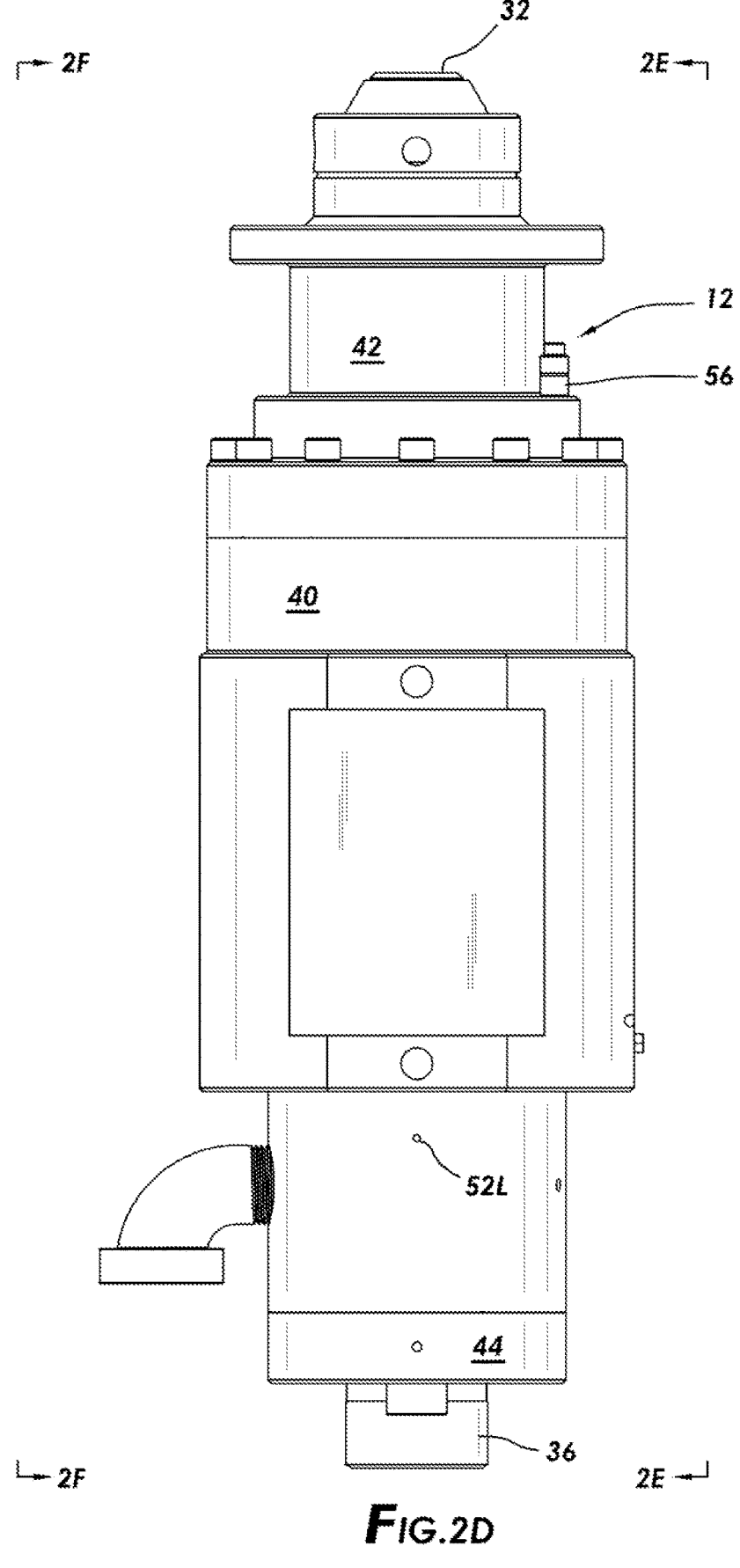
FIG. 2B is a front elevational view of the portable friction welding tool of FIG. 2A taken at line 2B-2B in FIG. 2A.
FIG. 2E is a side elevational view of the portable friction welding tool of FIG. 2A taken at line 2E-2E in FIG. 2D.
FIG. 2F is a side elevational view of the portable friction welding tool of FIG. 2A taken at line 2F-2F in FIG. 2D.
Figure 2E:
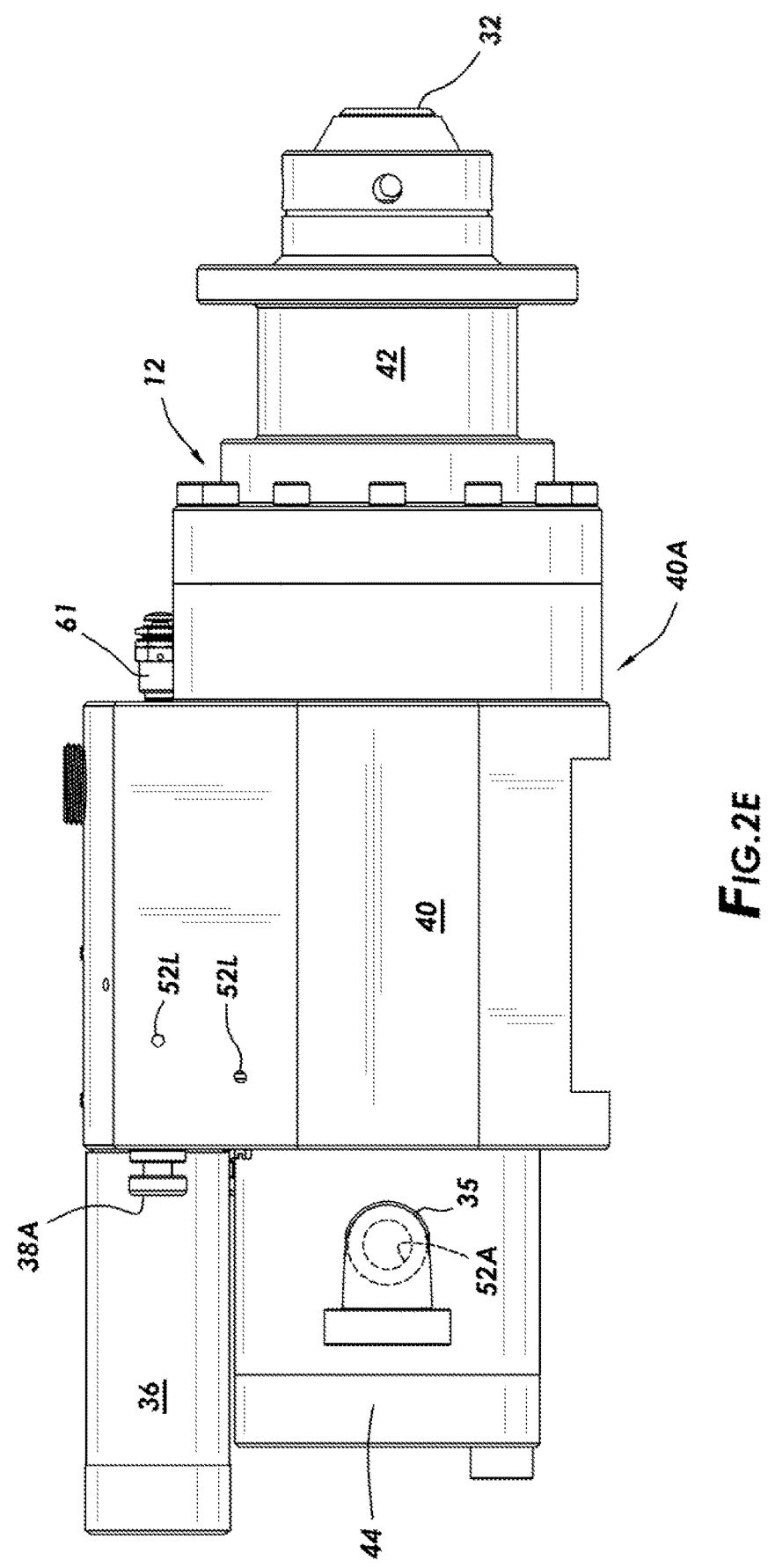
Figure 2F:
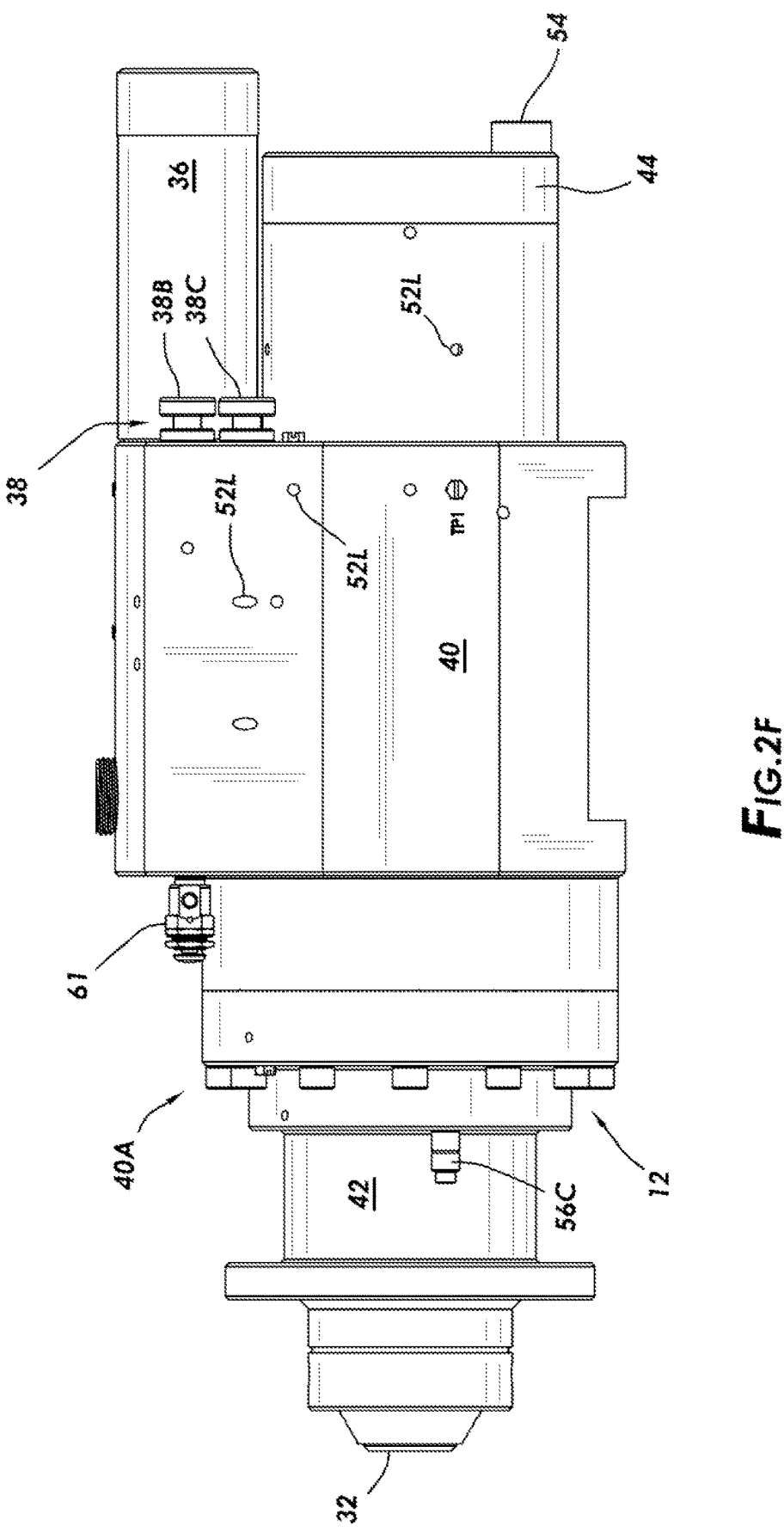
Figure 3B:
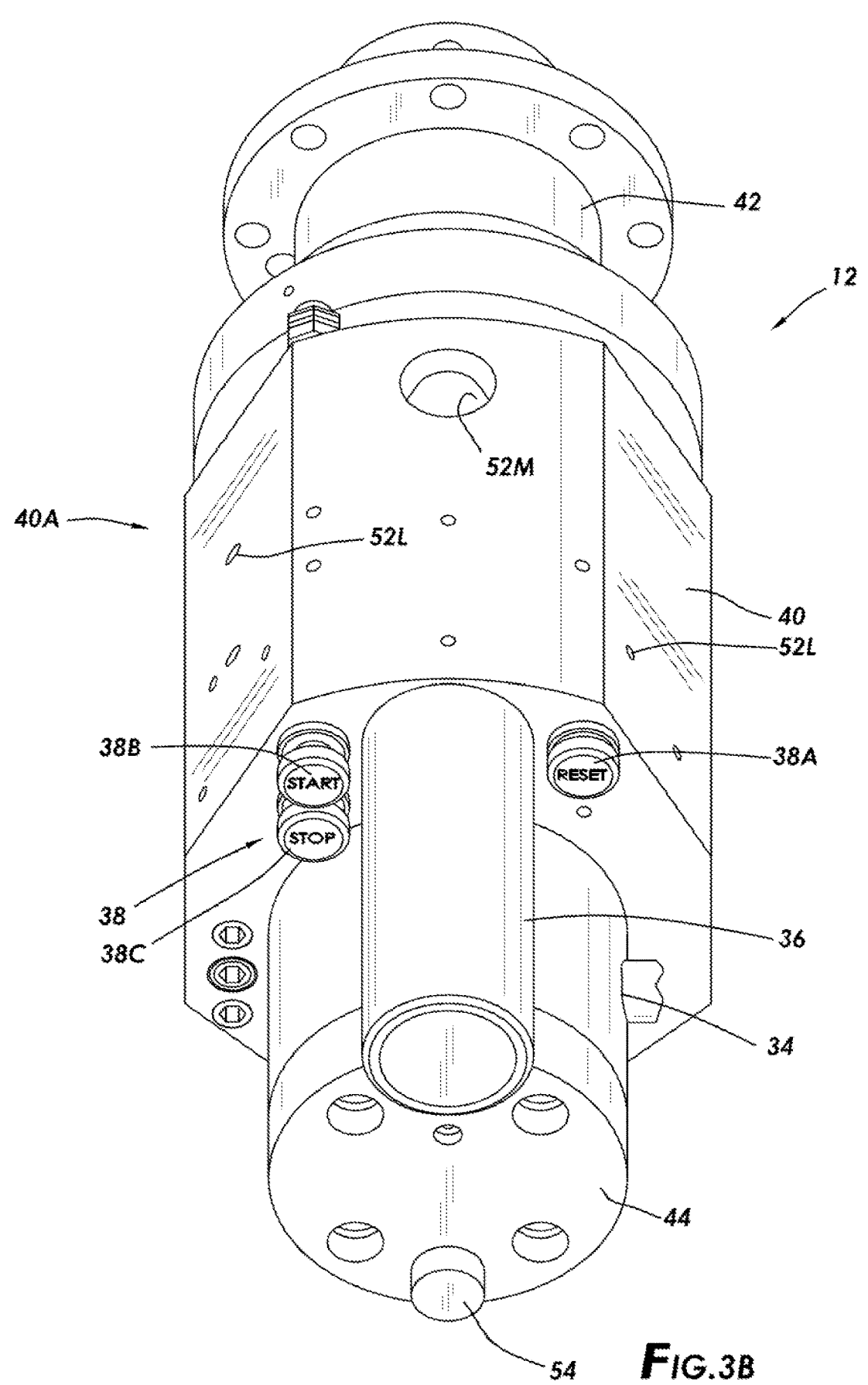
FIG. 3B is a perspective back/top view of the portable friction welding tool of FIG. 2A.
Figure 3C:
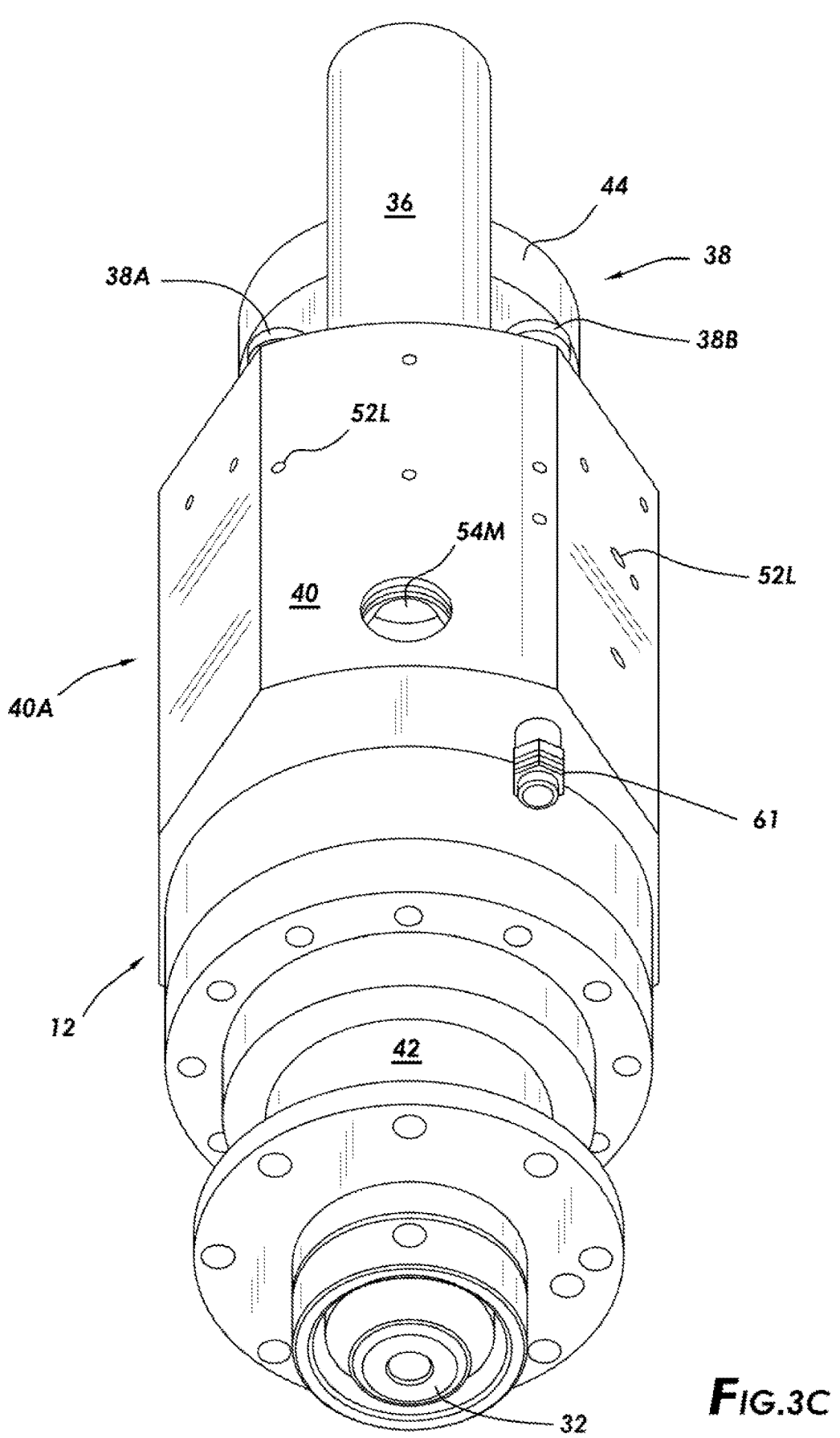
FIG. 3C is front/top perspective view of the portable friction welding tool of FIG. 2A.
Figure 4:
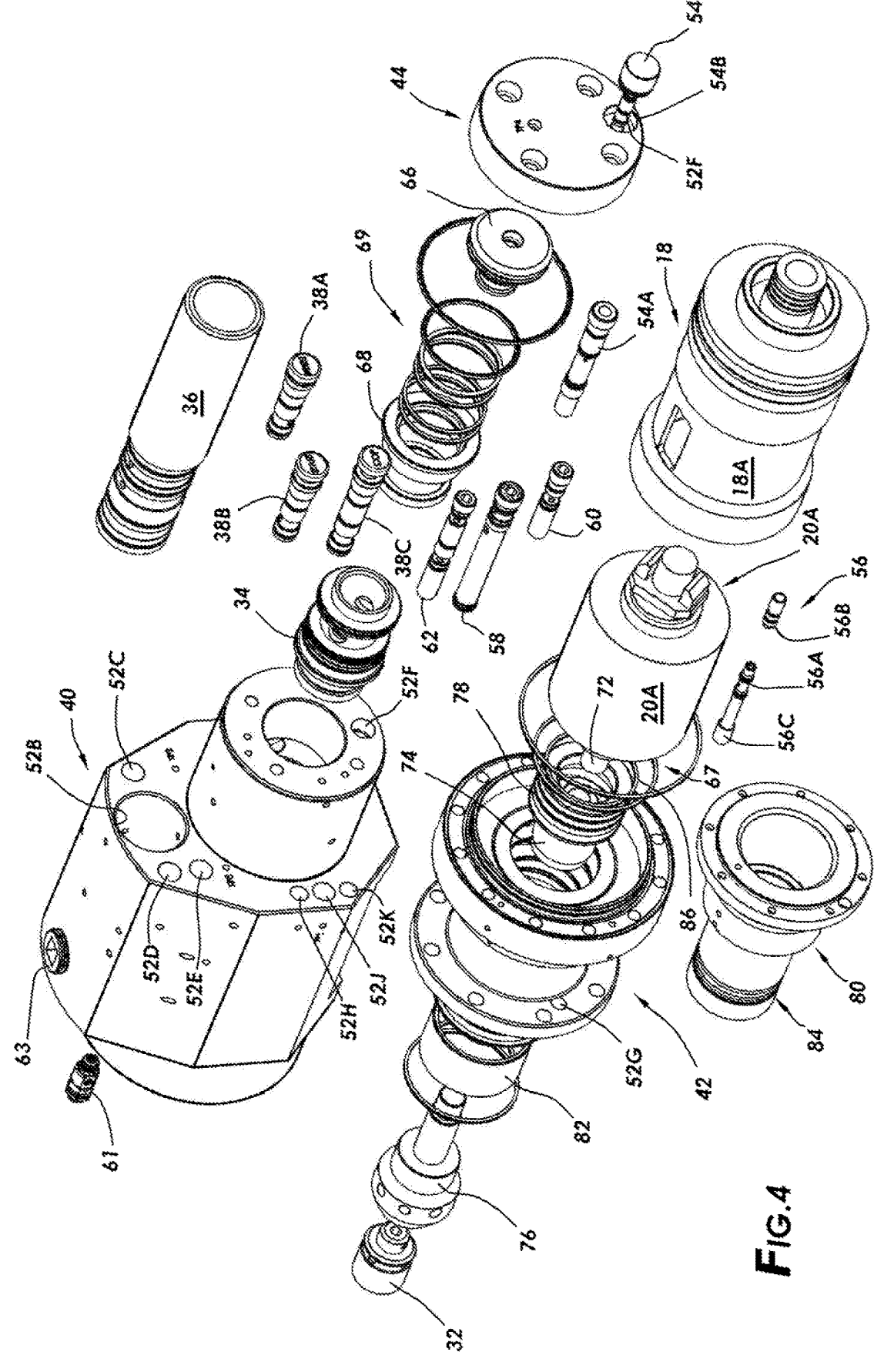
FIG. 4 is a perspective "exploded" view of the back/top/right (from the front) side illustrating components of the embodiment of a portable friction welding tool set forth if FIG. 2A.

FIGS. 3A-3C are perspective views illustrating the embodiment of FIG. 2A from the front/top/left side, back/top and front/top respectively. More detail of the constituent hardware components, both exterior and interior, are addressed in the "exploded" view of the principal hardware components of the embodiment of portable friction welding tool 12 in FIG. 4. These components are for the same embodiment illustrated in FIGS. 2A-2F and 3A-3C, above. This exploded view is taken in the perspective, looking from the top/right/rear or operator side.

Again, the housing of the tool in this embodiment is made up of front housing 42 which is bolted to main housing 40 with bolts 46 (see FIG. 2B) and sealed with housing end plate 44 secured by bolts 48 (see FIG. 2C). An orifice 52A in main housing 40 receives the air supply inlet 35 (see FIG. 2E) to bring supply air into main housing 40 and to fluid communication with air motor system 20A and forging piston system 18, see FIG. 1C. Further, orifice 52A of main housing 40 is in fluid communication with the exhaust of the pneumatic circuit (discussed below) and receives exhaust nozzle 36. It may be convenient to make secondary filter provision in air supply inlet 35 or air supply nozzle 34.

Orifices 52C, 52D and 52E at the rear of main housing 40 accept the operator controls 38 for reset, start and stop operations, respectively. These may be, e.g., poppet or spool valves, and include reset valve assembly 38A, start valve assembly 38B and stop valve assembly 38C, which present reset button 38B, start button 38E and stop button 38H, respectively, for operator access. See also FIGS. 2C, 2E, 2F, 3B, 5B and 5D. These are also discussed in greater detail in connection with FIGS. 6A-6G.

Returning to FIG. 4, movement of the actuator (illustrated here as a forging piston) managed by a forging pressure controller ("FPC") module 54 for building initial pressure and advancement. The FPC module comprises FPC module sleeve 54E and FPC valve stem 54F are received in orifice 52F through housing end plate 44 and presents a dial in control for a given range of applications facilitating the versatility of this embodiment of the present invention. See also the cross-section of FIG. 5A.

In this embodiment, the upset phase control system which is responsive to axial translation of the actuator (here forging piston 18A) is provided by a forging area controller module ("FAC") 56. The FAC provides another dial in control supporting the versatility of the present invention to a wide range of materials and applications. In this embodiment, FAC module 56 comprises FA controller element 56A, FAC threaded insert 56B, FAC tip 56F and FA control knob 56C. Here, FAC module is received into the housing through orifice 52G through front housing 42, see FIG. 2B. See also the detailed discussion of FIG. 7A, below.

Returning to FIG. 4, the rear facing surface of main housing 40 presents three more orifices where internal control elements are received into tool housing 40A through main housing 40, orifices 52H, 52J and 52K, receiving a shut off sequencer or SVUCCV module 62, a V90 control system module 58, and a BKCV control system 60, respectively. End caps may help protect these components. See also FIG. 2C. The forge pressure controller ("FPC") module 54 is received in orifice 52F. In addition, the forward face of main housing 40 presents an optional orifice 52N which can receive a pressure relieve valve 61 and an optional access port at orifice 52M on the top of the housing receiving access cap 63. See FIGS. 3A and 3B.

Building from the rear, forward, inside housing 40A, supply valve piston 66 resides just forward of end plate 44 within press fit sleeve 68 which is received at the rear of the forging piston). Ahead of that, forging piston 18A houses air motor 20A in a thrust bearing relation through air motor shims 67. And various o-rings 69 are illustrated to seal pistons within cylinders and across engaging surfaces of tool housing 40A and components installed through the housing to prevent the loss of air pressure, water intrusion and to define fluid passageways.

The output of air motor 20A is connected to collet 32 through AM coupling nut 72, shaft coupler 74 and shaft 76. This assembly passes through air motor seal spacer 78 and, optionally, double seal x-profile o-rings 86 to seal air motor 20A from the drive components which are surrounded by internal bearing housing 80 which engages the forward face of the air motor housing 20B. Press fit sleeve 82 engages internal bearing housing 80 and captures Bellville washers 84 between sleeve 82 and shoulders of internal bearing housing 80.

FIGS. 6A-6F illustrate the push button operator controls of an illustrative embodiment in greater detail, illustrating the ends of operator buttons 38 and longitudinal cross-sections through the respective poppet valves, showing plungers 38J connected to the respective buttons, poppet valve components 38K, biasing springs 38L, and sleeves 38M with ports 38P and seals 38Q.

FIG. 5A-5E illustrate longitudinal cross-sectional views through portable friction welding tool 12 taken planes denoted as reference lines in front elevational view, FIG. 2B and back elevational view FIG. 2C. These cross-sectional views also illustrate the many borings 52L into housing 40A through which precision drilling techniques are used to establish flow paths between relevant control and drive components in conducting air from air inlet 35, through supply nozzle 34, through these components and ultimately out exhaust nozzle 36. Straight line borings are brought in from different angles to intersect and establish fluid flow communication after which unused portion of the borings can be sealed, e.g., plugged or filled with epoxy. Other borings may be sealed with a tapped cap to leave access for instrumentation for tool diagnosis and/or calibration to for use in unfamiliar materials. Compare also 52L on the exterior of housing 40A, e.g., FIGS. 2E, 2F and FIGS. 3A-3C.

Figures 5C, 5D:
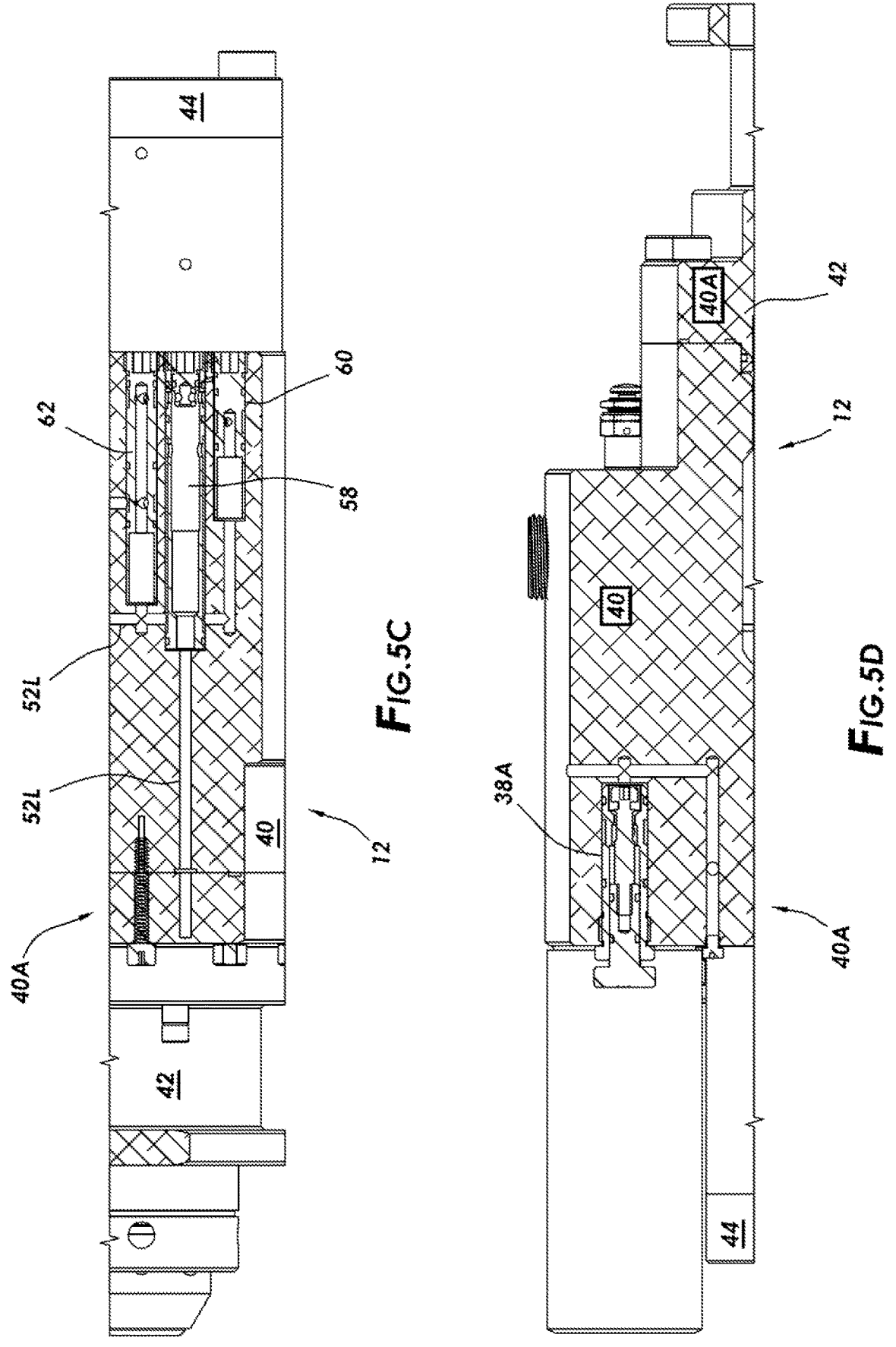
FIG. 5C is a partial longitudinal cross-section bisecting a control module section within an assembled portable friction welding tool taken along line 5C-5C in FIG. 2C.
FIG. 5D is a partial longitudinal cross-section bisecting a reset valve within an assembled portable friction welding tool taken along line 5D-5D in FIG. 2C.
Figure 5E:
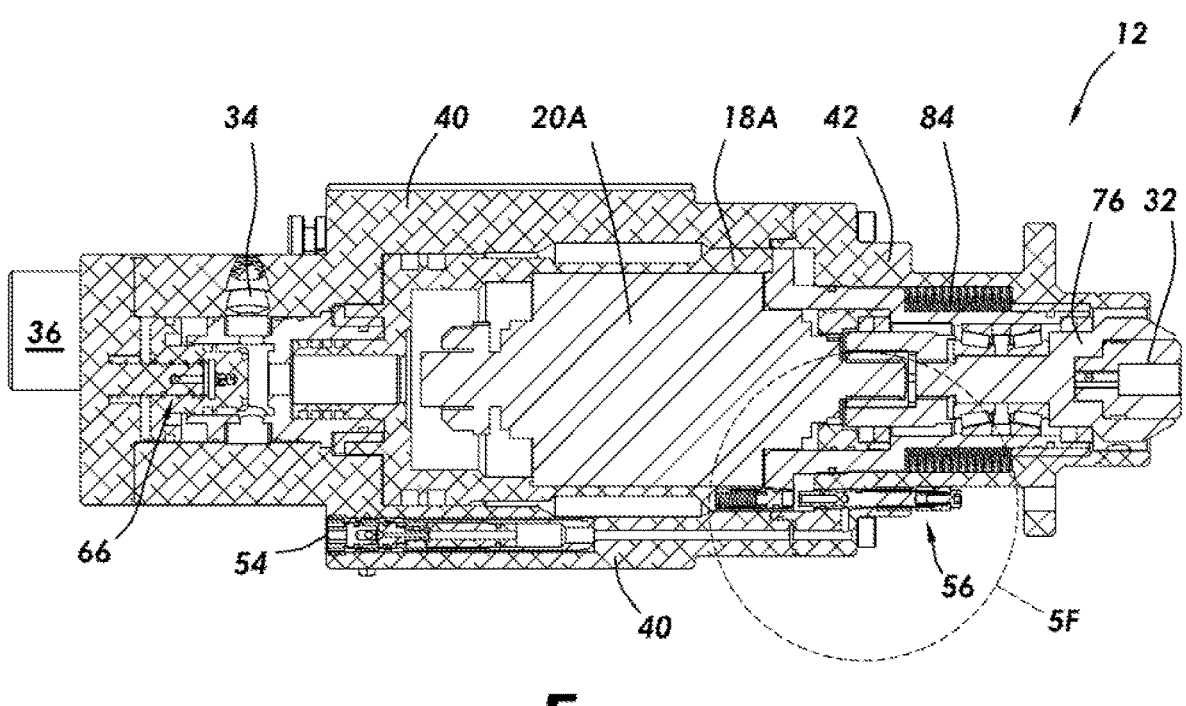
FIG. 5E is a longitudinal cross-section bisecting a forging area controller within an assembled portable friction welding tool taken along line 5E-5E in FIG. 2B.

FIG. 5A is a horizontal cross-section bisecting portable friction welding tool 12 and FPC module 54 along the longitudinal axis as shown in lines 5A-5A in FIG. 2C. FIG. 5B is a partial vertical cross-section bisecting option purge or pressure relief valve 61, start valve assemble 38D and stop valve assembly 38G as taken along the longitudinal axis and illustrated as line 5B-5B in FIG. 2C. FIG. 5C is a partial longitudinal cross-section taken to bisect each of SVUCCV 62, V90 vacuum module 58 and BKCV 60. FIG. 5D is a partial vertical cross-section bisecting reset valve assembly taken along the longitudinal axis and illustrated as line 5D-5D in FIG. 2C. And FIG. 5E is a partial vertical cross-section bisecting taken along the longitudinal axis and illustrated as line 5E-5E in FIG. 2B bisecting FAC module 56 with FIG. 7A being a closeup elevational view of that component. These figures will be discussed together in describing the broad mechanical operation of the portable friction welding tool and for the control system, refer to FIGS. 10-12 addressing operation of the tool.

Air supply orifice 52A (see FIG. 5D) passes supply air to the interior of housing 40A which, in this embodiment, comprises an assembly of main housing 40, front housing 42 and housing end plate 44. Air motor assembly 20A is received within forging piston 18A, which is sliding received within main housing 40. Turning to FIG. 5A, the forging piston can then provide thrust and displacement to air motor assembly 20A and through shaft coupler 74, shaft 76 and collet 32 and supported by air motor seal spacer 78. This thrust is transferred to a workpiece 8 to be joined such as a stud or boss mounted in the collet to press against the substrate while air motor 20A rotates such workpiece. (See FIG. 1B.) This thrust imparted from actuator, here forging piston system 18 overcomes the rearward bias from the spring action of Bellville washer stack 84 to push internal bearing housing 80 forward. Spent air exits portable friction welding tool 12 through exhaust nozzle 36. The position of various control elements is also illustrated in these cross-sections. For instance, supply valve piston 66 is illustrated inside the housing covered by housing end plate 44.

FIGS. 6A-6F show the operator controls of this embodiment in greater detail, illustrating the ends of operator buttons 38 and longitudinal cross-sections through the respective poppet valves, showing plungers 38J connected to the respective buttons, poppet valve components 38K, biasing springs 38L, and sleeves 38M with ports 38P and seals 38Q. Refer to the broader context about these components in FIGS. 5B and 5D.

Figure 5F:
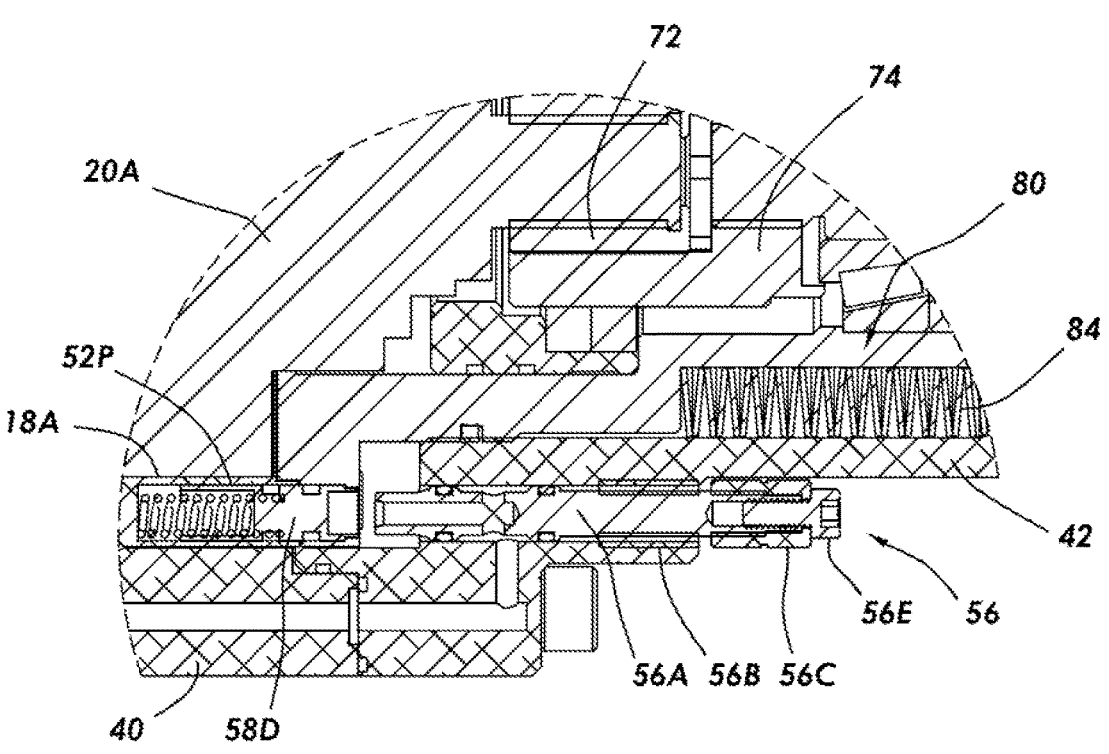
FIG. 5F is a closeup of a partial longitudinal cross-section of FIG. 5E taken at circle 5F in FIG. 5E.
Figures 7A, 7B:
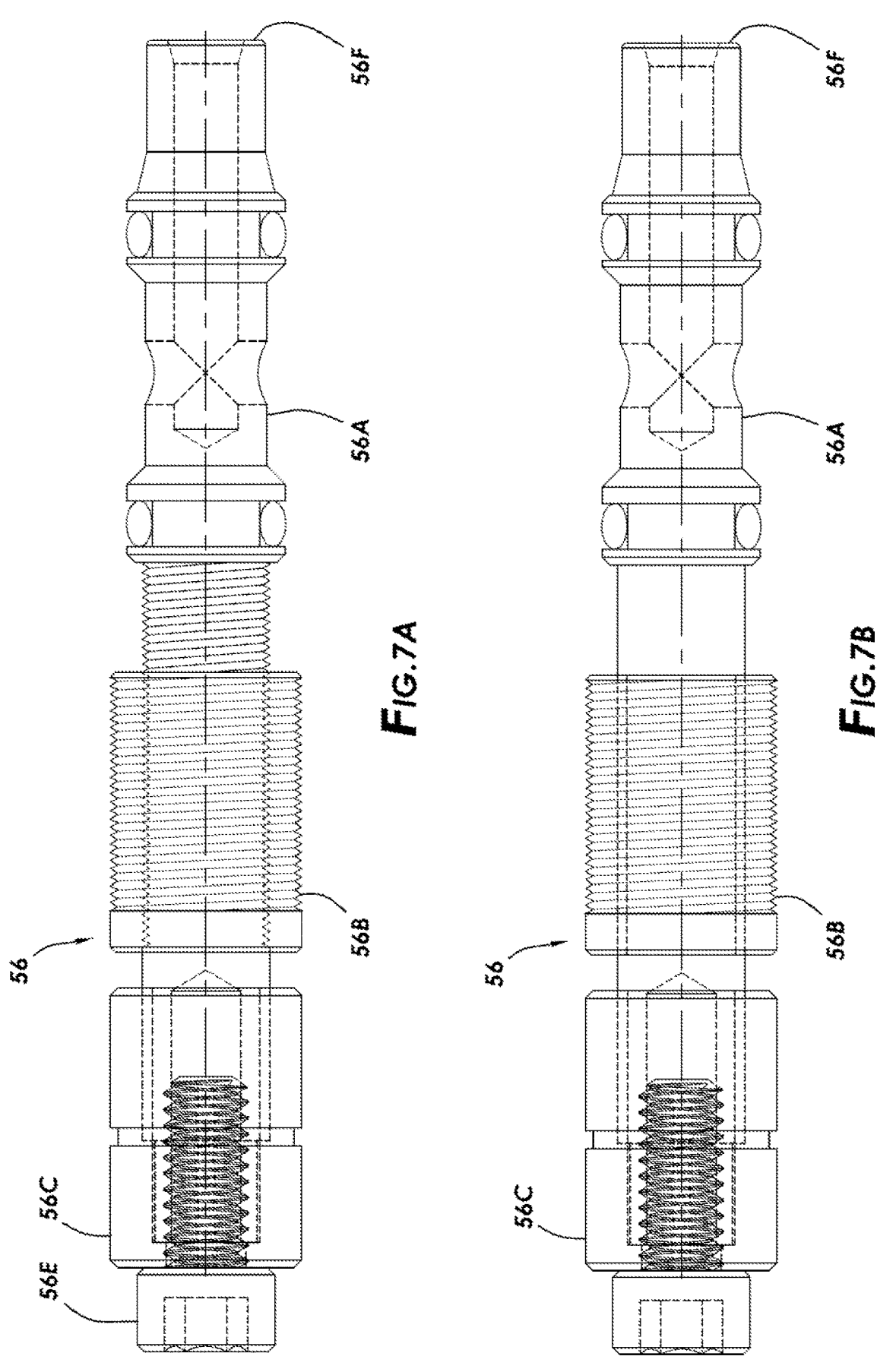
FIG. 7A is a close up longitudinal cross-sectional view of the forging area controller assembly of FIG. 5E.
FIG. 7B is an alternate embodiment of the forging area controller of FIG. 7A.

Similarly, the cross-section of FIG. 5E, the closeup cross-section of FIG. 5F and FIG. 7A longitudinally bisect FAC module 56 to illustrate FA controller element 56A, FAC threaded insert 56B, FAC seat 56D and FA control knob 56C. Exterior threads on FAC threaded insert 56B securely receive the FAC module into orifice 52G through front housing 42. Threads internal to FAC threaded insert 56B then adjustably receive FA controller 56A such that turning FA control knob or adjustment knob 56C will advance or withdraw FAC tip 56F of FA controller element 56A and FAC seat 56D presented at the leading edge of forging piston 18A. FAC tip 56F engages FAC seat 56D on the advancing forging piston, the engagement shuts off motor 20A and provides a secondary thrust through the forging piston to conclude the upset phase 6B and to hold through the cool down phase 6C of the friction welding process as introduced in FIG. 1A. An appropriate setting for FAC module 56 interacts with the FPC setting and is a function of the materials and the application involved in the joint. Once "dialed in" the FAC module can be locked down with head cap 56E through the welding operations appropriate to that setting for that job as discussed further in connection with FIG. 11B.

In the illustrated embodiment, FAC 56 is aligned with the longitudinal axis of the portable friction welding tool 12. This facilitates a more sure, direct, and accurate controlled mechanical engagement with the leading edge of forging piston 18A or the terminal end of an FAC receiving orifice 52P (see FIG. 8C) which is advancing directly into the direction of the FAC alignment.

FIG. 78 is an alternate embodiment of FAC module 56A. Here threaded insert 56B is formed integrally with FA controller element 56A to present a FA controller element 56 of fixed length. There is no need for head cap 56E. The knob 56B is not used for adjustment, but to screw FAC module all the way into orifice 52G to present FAC tip at a known, fixed position. Versatility is provided by having multiple FAC modules available, each of a unique fixed length and each configured for a specific application. Color coding can facilitate deploying the right module for the right application.

FIGS. 8A-8C illustrate perspective views of alternate embodiments of forging piston 18A. FIG. BA shows the forge piston of FIG. 4 in a larger illustration. Here circumferential groves 140 receive square profile seal elements 142 to establish an effective seal between the sides of forging piston 18A and the cylinder in which it moves. FIG. 8B illustrates an alternate embodiment of a forging piston 18A in which the forging piston has fewer groves 140 and the seal elements are round profile o-rings 142A.

FIG. 8C illustrates a forging piston 18A having an indexing key 144 which engages an axially disposed orifice in internal bearing housing 80 and an indexing key 146 which engages an axially disposed orifice in internal bearing housing 80 and passes therethrough into an axially disposed orifice in front housing 42. These keys engage these orifices to prevent rotation of forging piston 18A within its cylinder in response to a torque load from motor 20, the air motor 20A itself being mounted inside forging piston 18A in a manner that resists rotation between air motor 20A and the receiving forging piston, e.g., by another axially disposed key extending from the back face of motor 20 and into the rear face of the bore in main housing 40. Installation of forging piston 18A into the cylinder of the bore 18F within main housing 40 can prove a difficult operation given the precision of alignment required, the long stroke of the insertion, and force required for this insertion given the tight tolerances of the tool. However, in the embodiment of FIG. 8C, the sides of forging piston 18A are relieved in region 18L, providing tight tolerances where required, but a less tight fit elsewhere to facilitate assembly. Further, this embodiment illustrates an orifice 52P disposed to receive FAC seat 56D.

Figure 9B:
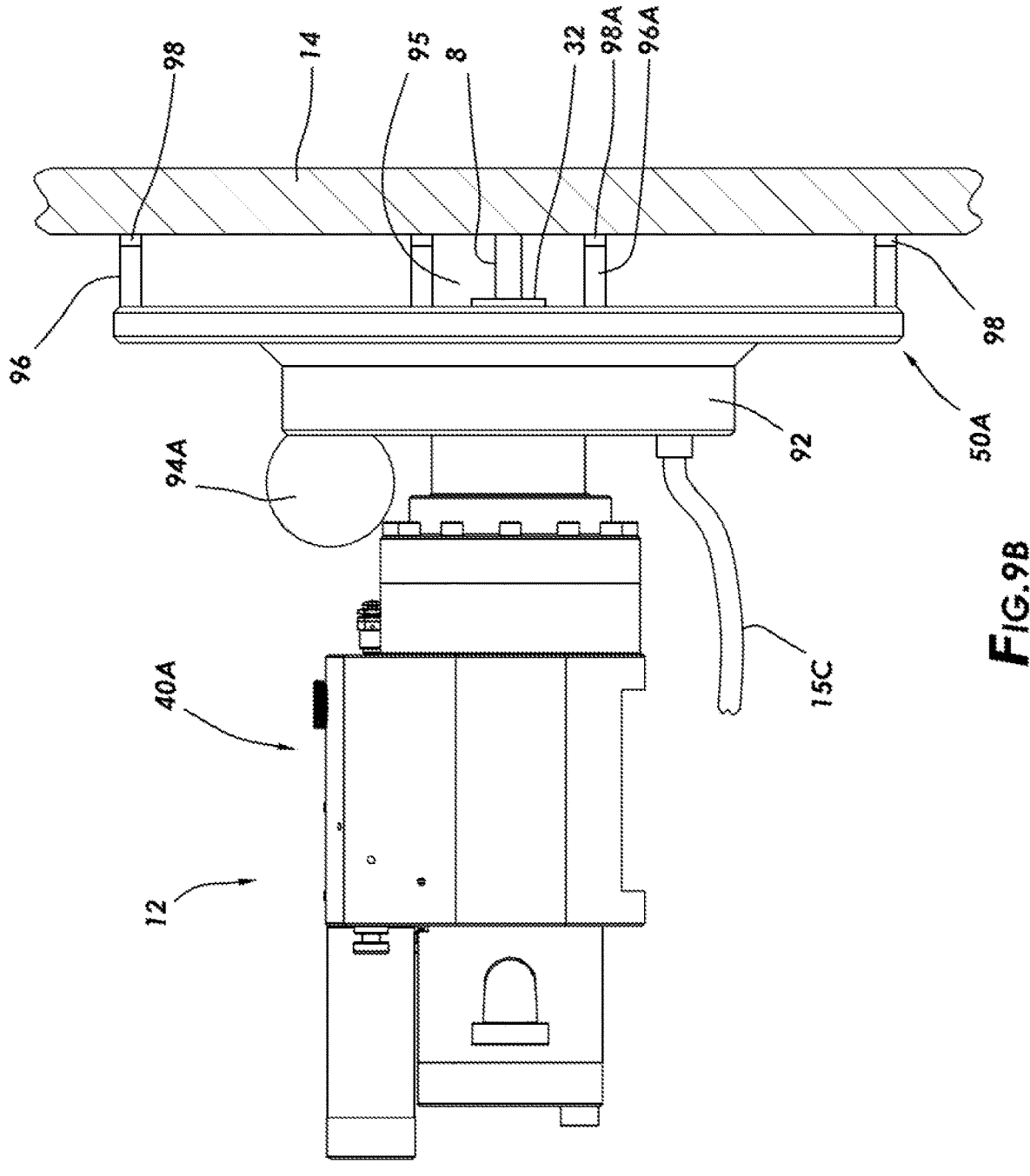
FIG. 9B as a side elevation overview of the portable friction welding tool and attached vacuum clamp illustrated in FIG. 9A taken from the vantage point of line 9B-9B in FIG. 9A.

FIG. 9A is a back elevational view of a portable friction welding tool 12 of the embodiment of FIG. 3A in an underwater application attached to a clamp system 50A, here illustrated as an embodiment with a vacuum clamping system 92. FIG. 9B as a side elevational view of the portable friction welding tool 12 and attached vacuum clamp illustrated in FIG. 9A taken from the vantage point of line 9B-9B in FIG. 9A. Use of a clamping system 92 (see also schematic of FIG. 1B) facilitates friction welding operations by connecting tool housing 40A directly to substrate 14 to hold against reactive forces such that full effect of thrust and rotation is effectively concentrated at the interface of rotatable workpiece 8 and substrate 14.

In use, clamp 92 is connected to the forward end of portable friction welding tool 12 with the end of collet 32 extending therethrough to receive rotatable workpiece 8. With the workpiece secured in collet 32, clamp 50A is brought to position the workpiece 8 at the desired weld site. Leading edge 96 of clamp system 92 presents a gasket 98 to secure the seal and vacuum provisions 110 of topside equipment 102 (see FIG. 10) draw a vacuum through vacuum line 15C to evacuate the area under clamp 50. Optionally, clamp 50 may provide a subarea 95 defined close about collet 32 and provided with its own isolating leading edge 96A and gasket 98A.

Depending upon the specifics of the application, purge provisions 94 may be a useful option. The purge provisions can pipe supply air, exhaust air or a compressed gas into subarea 95. In this illustrative embodiment, purge provisions 94 use a compressed gas tank 94A outfitted with purge line and controls 94B. The ability to control the environment in the immediate area of an underwater weld site may be used to enhance the quality of the weld, e.g., control the quench rate (gas instead of residual water or salt water), allow for a dry weld and attendant properties, or allow the use of select inert gas when dealing with difficult materials (e.g., the use of argon or other inert gas to mitigate rapid oxidation when dealing with titanium) or to mitigate concerns with a potentially explosive environment. When deployed, purge provisions 94 are used to flood subarea 95 with a gas while the surrounding area is under a vacuum.

Many alternative designs for clamping systems are possible, depending upon the application. One particularly advantageous system when an array of closely and precisely spaced fixtures is required is disclosed in provisional application 62/881,340 for Lau et al filed on Jul. 31, 2019 for A Mufti-position Clamp for Friction Welding Operations, the disclosure of which is hereby incorporated by reference.

After the weld has proceeded through the automated burn-off phase and upset phase, an appropriate cool down phase ensures full weld solidification and, in this embodiment, a manual reset triggers collet 32 to release workpiece 8 and withdraw. Clamp 50A can be then be released, here by terminating the vacuum at vacuum clamp controls 110 and portable friction welding tool 12 is withdrawn from substrate 14 in a straight out, perpendicular fashion. If the weld was conducted underwater, air supply 11B from topside facilities 102 should not be shut off until portable friction welding tool 12 has been returned to the surface. Alternatively, components can allow for sufficient "blow-by" to ensure that there will always be a positive pressure differential necessary to prevent water from entering the tool.

Figure 10:
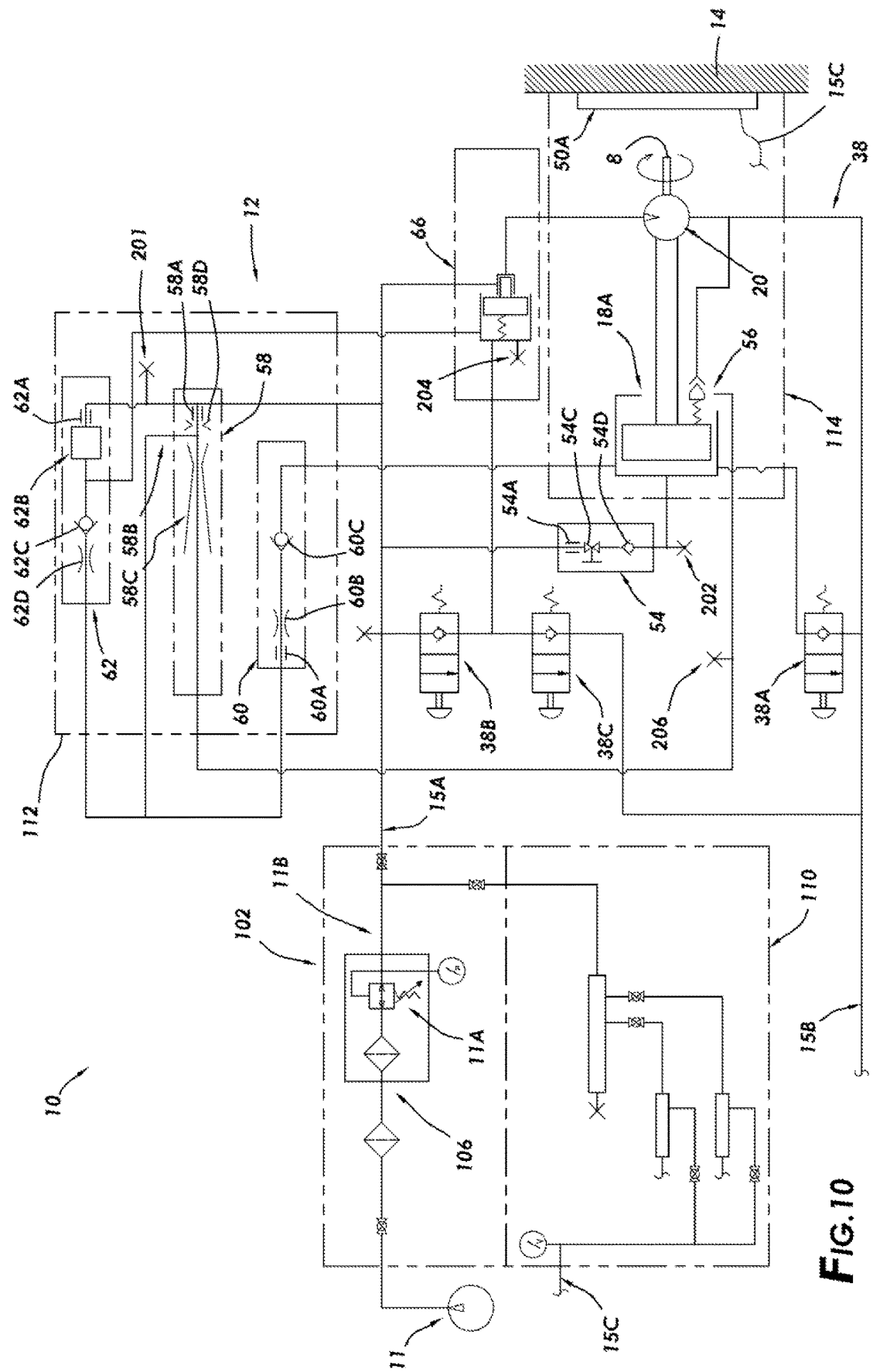
FIG. 10 illustrates a pneumatic circuit diagram of one embodiment of a portable friction welding system in accordance with the present invention illustrated in FIG. 2A.
Figure 11B:
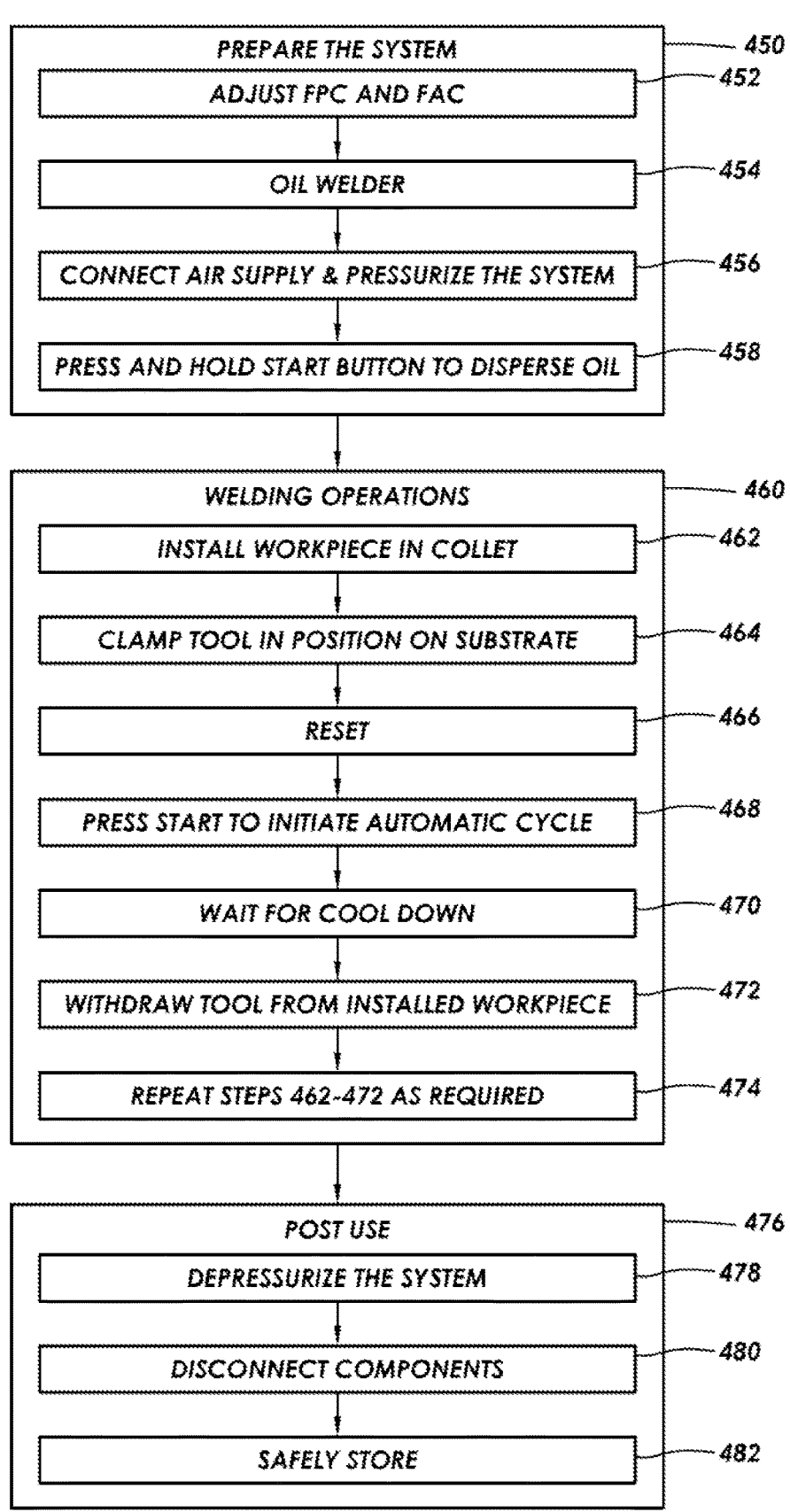
FIG. 11B is a flow diagram focused on operator-initiated steps in one embodiment of system operation.
Figure 12:
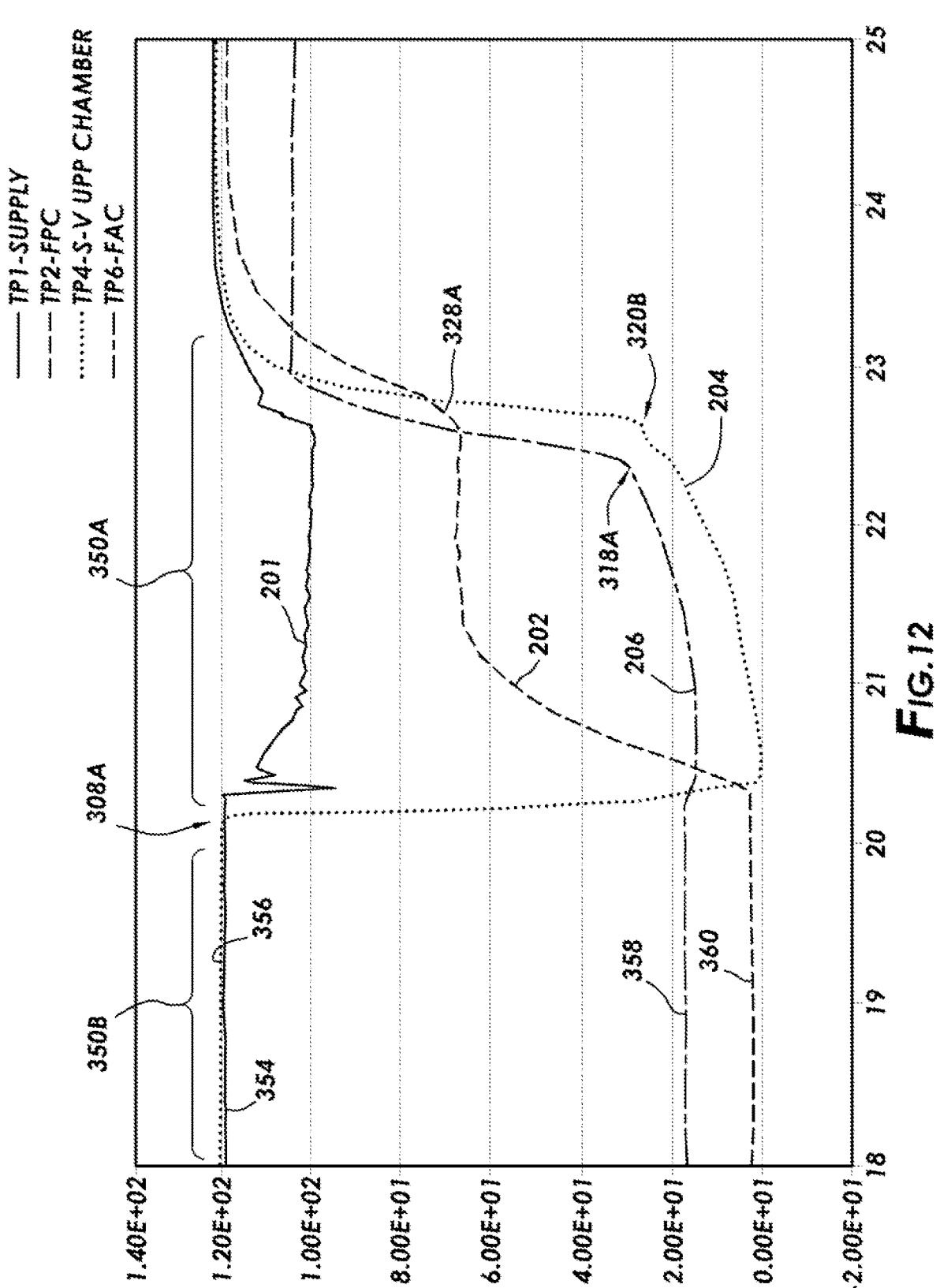
FIG. 12 is a graph illustrating pressure against time through a welding operation using the automated, portable friction welding tool of FIG. 3A and the pneumatic circuit of FIG. 10.

An embodiment of the composition and operation of portable friction welding system 10 is illustrated through reference to the pneumatic circuit of FIG. 10, the flow diagrams of FIGS. 11A and 11B, and the pressure graph of FIG. 12. FIG. 10 is one embodiment of a pneumatic circuit for the portable friction welding system 10 illustrated with the foregoing illustrative hardware and will be first described to address the composition of this illustrative circuit. In this embodiment these flow lines utilize intersecting pathways 52L (in the hardware figures) drilled (with unneeded portions plugged, backfilled with epoxy, tapped and capped or the like) in the body of the housing combined with channels and pathways defined within the interior of the housing to establish the circuitry. For the purposes of this illustration, the components of the portable friction welding system have been divided to topside equipment 102, operator controls 38, control module segment 112, supply valve piston 66 and welder segment 114. In this example, (topside equipment 102 comprises a power source in the form of a compressor 11 connected to filters 106 to filter the air and to remove moisture in the line and regulator 11A to establish an air supply 11B. Optionally, air supply 11B also drives vacuum clamp controls 110 as part of topside equipment 102. The vacuum clamp controls are connected to vacuum clamp 50A at portable welding tool 12 through a vacuum line 15C.

Air supply 11B of topside equipment 102 is connected to portable friction welding tool 12 through air supply line 15A. Air supply line 15A is connected to control module segment 112 at supplied test port 5 (denoted as access 205 and as an input to the vacuum module or V-90 control system module 58 through an inlet flow restriction 58A and to flow control element 62A associated with supply valve upper chamber check valve ("SVUCCV") 62. Flow control element 62A combines an inlet flow restriction 62A with a following chamber 62C of sufficient volume to effectively act as a timing circuit. SVUUC also has a fixed flow restriction 62D a one-way check valve 62C and arranged to carry an alternate feed to the large side of a motor supply valve 66. Test port 1, designated 201, is positioned between vacuum module 58 and flow controller 62A.

As noted, the outflow of SVUCCV 62 is connected to the large side of supply valve piston 66 which is also biased by a spring for nominal closure and provides test port 4, denoted as access 204 in FIG. 10. The small piston side of supply valve piston 66 is positioned between air supply line 15A and air motor 20 and therethrough on to exhaust line 15B.

Returning to control module segment 112, the vacuum module, V-90 control of system module 58 has an inlet restriction 58A followed by a venturi effect producing fixed restriction 58D followed by a fixed restriction 58C. The normal outflow of vacuum module 58 is connected to forging area controller ("FAC") 56 and therethrough to exhaust line 15B. Test port 6, denoted access 206, is positioned between V-90 controls system module and FAC 56. The vacuum take-off line 58B of V-90 control system module 58 is connected to a second inlet to SVUUCV 62 and, through BK check valve ("BKCV") 60, to the welder segment 114 at 58B the rear facing side of forging piston 18A. As explained further below, vacuum take-off line 58B is the conduit for positive pressure outflow from vacuum module 58 for shutting off motor 66 and presenting flow to BKCV 60. The BKCV has an inlet flow restriction 60A, a fixed flow restriction 60B and a one-way check valve 60C.

The rear facing side of the forging piston is also connected to test port 2 (denoted as access 202) and to air supply line 15A through forging pressure controller ("FPC") 54. FPC 54 presents an inlet restriction 54A, an adjustable shut-off valve 54C and a one-way check valve 54D between the air supply and the forging piston.

Operator controls 38 include reset valve 38A connected between the rearward facing side of piston 18A and exhaust line 15B, start valve 38B positioned between the cylinder or chamber receiving the large side of supply valve piston 66 and exhaust line 15B, and stop valve 38C is positioned between air supply line 15A and the cylinder receiving the large side of supply valve piston 66.

Having reviewed the layout of the pneumatic circuit in connection with FIG. 10, we turn to the operation of a portable friction welding system 10 in accordance with an illustrative embodiment of the present invention. In this discussion, operational steps set forth in the function flow diagram FIG. 11A and representative test results taken at key monitoring points in the pneumatic circuit in the pressure/time graph of FIG. 12 supplement a review what happens in the pneumatic circuit 10A of FIG. 10.

In this embodiment, the first functional step of using the portable friction welding system is set up step 300 in FIG. 11A, including checking that valves on the manifold for air supply (and vacuum, if a vacuum clamp is deployed) are closed, making hose connections, checking that the forging area controller module 56 and the forging pressure control 54 settings are appropriate for the job at hand. The air inlet to the portable friction welding tool is accessed and the system is oiled with 8-10 drops of air oil in the air inlet. The air supply line is replaced and compressor 11 is started. Refer also to the hardware figures. Set up proceeds with opening manifold valves and confirming that air supply 11B and, if a vacuum clamp 50A is being used, that the vacuum are at appropriate pressures. In this illustrative embodiment, the air supply should be at 125 PSIG and the vacuum at 26 inches Hg. The reset valve 38A is held open to purge any air and thereafter start valve 38B is opened and held for 5-7 seconds before it is allowed to close. These steps allow the Bellville spring stack to drive forging piston 18A to a withdrawn position and run motor 20A, drawing an aerosol from the oil placed at the inlet through the tool. These oil, reset and run steps are repeated as appropriate for the job and the portable friction welding system is ready to go into service.

An externally threaded stud, internally treaded boss or other workpiece, element or member 8 is secured in collet 32, see step 302 in FIG. 11, and the portable friction welding tool is placed and secured (step 304) relative to substrate 14, see FIGS. 1B and 9A-9B. While this illustrative example deploys a vacuum clamp, it should be appreciated that there are many forms of suitable clamps to place and secure the portable friction welding tool. In the case of vacuum clamp 50A, placing and securing step 304 includes checking to determine that the vacuum is holding with a good seal before starting the portable friction welding tool.

Returning to FIG. 10 and the hardware cross-section of FIG. 8B, "at rest" portable friction welding tool 12 will have supply valve piston 66 spring biased to a closed position cutting off air flow to motor 20A and the forging piston 18A is retracted away from the substrate by Belleville spring washer stack 84. With full pressure applied through the air supply line 15A, pressure is brought directly from air supply line 15A to the small side of supply valve piston 66 and, at the same time pressure received through flow control device 642A in SVUCCV 62 which presents the flow to the large side of supply valve piston 66. The differential area between the front and back side of supply valve piston 66 causes it to stay closed, sealing against flow to motor 20A.

Reset step 306 in FIG. 11 is accomplished by pushing and releasing of the button of reset valve 38A. See FIG. 10. This releases the pressure on the rearward face of forging piston 18A to exhaust. This fully retracts forging piston 18A as driven by Belleville washers 84 and further communicates to reset elements in control module segment 112. Turning to FIG. 12, this reset step 306A is characterized by high pressure at access 201 representing the supply pressure, high pressure at access 204 serving to ensure that supply valve piston 66 controlling motor 20A is in the "off" position, low pressure at access 206 showing that FAC 56 is mildly restrictive but not closed and essentially ambient pressure at access 204 as pressure has been relieved to exhaust at the back of forging piston 18A.

Returning to FIG. 10, a press and release of the button for start valve 38F releases to exhaust the pressure acting on the rearward facing or of large side of supply valve piston 66, creating an imbalance with respect to the high pressure on the forward facing small face of the piston and overcoming the bias of an internal spring in order to push supply valve piston 66 to an open position and pass the high pressure air supply therethrough to drive motor 20A and to then to exhaust.

Controlled flow though forging piston controller 54 begins building the pressure on the rearward facing side of forging piston 18A after pushing the start button, overcoming the bias from Belleville washer stack 84 and pressure acting on the smaller area of the frontward facing edges of the piston. Refer also to the hardware figures. The settings for shut-off valve 54C acting as a variable restriction in forging pressure control 54 allows adjustments in the rate of this pressure rise to match the requirements of the application. Forging piston 18A advances as it overcomes the modest force of the Belleville washer stack 84 and supply pressure multiplied by the annular area of the internal bearing housing. As forging piston 18A advances, it carries motor 20A, shaft 76, collet 32, and stud, boss or other rotatable workpiece 8 forward. Refer again to hardware figures. In an illustrative example, a supply pressure at 125 psig (98.6 bar) can result in a force up to 1150 lbs. (5 kN) pressing workpiece 8 against substrate 14. The combination of thrust and rotational energy from motor 20A is dissipated as heat at the interface between rotatable workpiece 8 and substrate 14, e.g., raising the temperature as a local effect in a tightly limited area in the immediate vicinity of intersection of these components which then start to flow plastically as workpiece 8 penetrates the substrate, e.g., 0.160 inches (4 mm). However, this depth will vary based on the materials and the application involved in the joint.

While forging piston 18A is advancing and FAC 56 has not yet engaged, high pressure flow from air supply line 15A passes V-90 control system module 58 and through FAC 56 to exhaust. This flow draws a vacuum at the vacuum take out which cuts off flow through BKCV 60 and SVUCCV 62. However, as forging piston 18A advances, FAC seat 56D which is spring loaded in a cavity of on the forward piston 18A is brought forward to engage the tip of FA controller 56A. The contact between these parts seals an orifice on the forward side of forging piston 18A which had been passing flow from V-90 controls system module 58 to exhaust. With this flow blocked, pressure builds as flow through the V-90 control system module slows and ceases. With back pressure building and no forward flow through the venturi of V-90 control system module 58, backflow exits the vacuum take off 588 and builds pressure at SVUCCV 64 and is passed to the rearward side of supply valve piston 66 where the pressure builds to drive that valve to shut off flow from air supply line 15A to motor 20A. The flow and building pressure bleeding from the vacuum take off of V-90 control system module 58 also passes to BKCV 60. An output from the BKCV is presented to enhance the thrust form forging piston 18A acting at the engagement of element 8 and substrate 14 if the pressure from FPC 54 is insufficient for the upset phase and flow from the BKCV also mitigates harmonic vibration that may be setting up in forging piston 18A from the rapid application of forces during the cycle.

Turning to FIGS. 11A and 12, start step 308 in FIG. 11 marks the beginning of automated weld cycle 350 and corresponds with time 308A and cycle time 350A in FIG. 12. Time period 350B represents the "reset" step FIG. 12 before pressing Start. Start 308 relieves the pressure holding the supply side piston 66 in the "off" position as seen at test port or access 204, causing the supply valve piston to open on (step 310) to turn on the motor, step 312. Time 308A also corresponds with a drop in the supply pressure at access 201 and the beginning of a pressure build cycle through noted as FPC step 312 causing the forging piston to advance in step 316 as the pressure build at access 202 slows and may level off. Movement of the forging piston, in turn progressively restricts flow through the FAC showing a bit of a rise in pressure 206 through automated cycle 350A until the FAC effectively seats at a closed position (step 318) reflected as the pressure inflection point 318A near the end of automated cycle 350A. The steepness and total rise through this inflection is a function of the combined dialed in settings of FPC module 54 and FAC module 56, this example reflecting a particularly restricted FPC setting. FAC closing 318 causes a communication back through the vacuum module vacuum take off to the SVUCCV (step 322). Note the corresponding pressure rise at access 204 (FIG. 12) at inflection point 318A. This pressure serves to close the supply valve piston and shut down the motor as steps 324 and 326 in FIG. 11A, respectively.

This back pressure through the vacuum module in step 320 also opens the BKCV, step 328. Engagement of the BKCV conducts more pressure to the rear of the forging piston, seen as a sharp inflection 328A in the pressure curve from access 202. This concludes automated cycle 350 with the step of establishing and maintaining maximum forging pressure, step 330. There is then a wait period to allow the weld to fully set before pressing reset, step 332. This automated process from start to holding under full forging pressure as the motor stops takes about 3 to 6 seconds. The forging pressure is maintained to allow the material in the weld to solidify completely. A 20-30 second cool down period has been found effective in most applications. Another push and release the reset button briefly opens reset valve 38A to vent to exhaust the pressure on the rear face of forging piston 18A. Reset allows the forge piston to withdraw and the collet releases and leaves the welded workpiece in place, see step 334. The clamp can be released in step 336 (whether that is releasing the clamp from the substrate or the tool from the clamp) and the portable friction welding tool is removed (step 338) and is ready to insert another stud or boss (step 302) and repeat the process (step 340).

Returning to FIG. 10, in the event that the automated process does not timely shut motor 20 down, opening stop valve 38B will pass high pressure supply air from line 15A directly to the back of supply valve piston 66 to shut off air flow to motor 20.

The example of FIG. 12 produced a sound weld with a tight setting on FPC 54, accentuating a role for the pressure contribution from BKCV 60. This is not necessarily the case and the contribution, if any, at other FPC/FAC combinations can vary and still produce a sound weld.

The discussion of FIG. 11A focused on what is happening inside the tool in practice of an embodiment of the present invention. FIG. 11B is a flow diagram focusing on the role of an operator in this illustrative embodiment.

The discussion of FIGS. 10, 11A and 12 integrate what the operator does, what is happening in the tool and progress in the weld. However, an important feature of the present invention is the ease of use to the operator which is best illustrated by focusing on the operator's steps to produce a sound weld. FIG. 11B provides this focus.

After the operator dons the appropriate personal safety gear, the operator begins preparing the system for the job at hand (grouping 450) with step 452, making sure that the collet matches the workpieces to be installed and that the forging pressure controller (FPC) and forging area controller (FAC) are dialed into appropriate settings to facilitate the best automated and highest quality welds for the desired application. By way of example, present experience with the illustrative embodiment of FIG. 2, et al, suggests the following instructions for dialing in the forging area controller relative to the forging pressure controller will support many key commercial applications with a single set up at the beginning of a job. These instructions reference from first fully seating the component and then backing out the designated turns. Note also, though these examples are set out in English units, they are applicable to commonly available substantially corresponding metric units.

over the substrate, step 464, and pushes the "reset" button, step 466, and holds that button down for a full second or until the collet is observed to fully retract. Pressing (and releasing) the start button, step 468, begins the automated weld cycle and the tool should automatically shut itself down in 2-4 seconds. By way of backup, a manual stop button is provided that should be pushed if to tool does not automatically shut down after 6 seconds. The operator then waits, e.g. 30 seconds, for cool down in step 470 and the tool can be withdrawn from the installed workpiece, step 472. Step 474 is repeating steps 460-472 as desired.

At the end of the job or the end of the day, the operator takes down the system, post use step 476, by depressurizing the system, step 478, and removing hoses, clamps and other auxiliary equipment, step 480, and safely storing the tool and system components, step 482.

Other aspects of the ease of use are best illustrated with a return to the hardware figures. For instance, note in FIG. 2C that all of the operator controls 38 for making the weld are clustered conveniently and accessibly at the back of the tool 12. And these controls used during welding operations are separated from set up controls FPC 54 and FAC 56 (FIG. 2B) that are accessed once during set-up before the job. It is also important that all of these controls, set up and operator controls are accessible on the ends of tool 12 so that important accessories such as an FBS buoyancy system to facilitate under water operations will not interfere with

| Material Group: Carbon Steel | | | | | |
|---|---|---|---|---|---|
| Stud/Boss Size | Stud/Boss Material | Weld Subject Thickness | Weld Subject Material | FPC Setting | FAC Setting |
| Ø½ × 2¼" L Stud | 1018 Carbon Steel | ³⁄₁₆" minimum | A36 Steel | 2 turns | ¼ turn |
| | 1018 Carbon Steel | ³⁄₁₆" minimum | DH36 Steel | 2 turns | ¼ turn |
| | 1018 Carbon Steel | ³⁄₁₆" minimum | HY80 Alloy Steel | 2 turns | ¼ turn |
| | D36 Steel | ³⁄₁₆" minimum | A36 Steel | 2 turns | ¼ turn |
| | HY100 Alloy Steel | ³⁄₁₆" minimum | A36 Steel | 2 turns | ½ turn |
| Ø½ × Ø¾" Boss | 1018 Carbon Steel | ³⁄₁₆" minimum | A36 Steel | 2½ turns | ¼ turn |
| | 1018 Carbon Steel | ³⁄₁₆" minimum | HY80 Alloy Steel | 2½ turns | ¼ turn |

| Material Group: Corrosion-Resistant Steel | | | | | |
|---|---|---|---|---|---|
| Stud/Boss Size | Stud/Boss Material | Weld Subject Thickness | Weld Subject Material | FPC Setting | FAC Setting |
| Ø½" × 2¼" L Stud | 304 Stainless Steel | ³⁄₁₆" minimum | A36 Steel | 1¼ turn | ½ turn |
| Ø½ × Ø¾" Boss | 304 Stainless Steel | ³⁄₁₆" minimum | A36 Steel | 1¼ turn | ½ turn |

50

The next step is regular maintenance of oiling the air motor, step 454, at the beginning of a day's work. A few drops of a light oil are placed in the air intake before connecting the air supply and pressurizing the system, step 456, e.g., 125 psi for the illustrative embodiment of FIG. 2A. With the system fully pressurized, the operator secures the tool and presses and holds the "START" button for a series of 8-10 second dry runs to disperse the oil throughout the tool. See step 458. At this point the tool should be ready for service, though it may be useful to start with a test weld which may be immediately inspected to see if a return to step 452 for any minor tweaks to the FAC and FPC settings might better optimize performance in the present circumstances.

The operator begins welding operations 460 with inserting a workpiece such as a stud or boss into the tool's collet as step 462, positioning and clamping the tool into place normal operation. The shape of the controls may also be used to provide tactile feedback when operating in low visibility situations. One such buoyancy provision is set out in U.S. provisional application Ser. 62/754,295 filed Nov. 1, 2018 by Griffin et al for Buoyancy Provisions for Facilitating Underwater Friction Welding, the full disclosure of which is hereby incorporated by reference.

As noted in the forgoing table, matching collet, FPC and FAC settings can produce a very versatile tool capable of automatic operation for generating automatic welds on a wide range of applications across numerous materials and sizes. Further, in shop adjustments in inlet restrictions 54A, 58A, 60A and 62A (FIG. 10) e.g., changing of orifice set screws, and adjustments in Bellville washer spring stack 84 can further extend this range for the same tool to a new start point from which FPC and FAC settings can provide for a range of applications.

A particularly advantageous application of the present technology is underwater welding of difficult materials such as aluminum or stainless steel (300 series) workpieces to aluminum substrates. Ship building and other maritime and offshore applications value the benefits of aluminum in resisting corrosion. However, even as more and more ferries, patrol boats, naval and maritime vessels are using aluminum hulls, the ability to weld underwater to aluminum alloys such as the 5000 or 6000 series has remained a daunting a challenge. Yet portable friction welding, especially auto- mated portable friction welding, has proven capable of making strong joints with difficult corrosion resistant mate- rials to aluminum substrates underwater using this method. Further, those skilled in the art, given the benefit of this disclosure, may adapt portable friction welding of aluminum underwater to systems with other pneumatic, hydraulic and electrical drives without departing from the scope of this aspect of the present invention.

What is claimed is:

1. An automated portable friction welding system for friction welding a workpiece onto a substrate at an interface between the workpiece and the substrate, said system com- prising:

a power system providing a first power input and a second power input, each selected from a group comprising pneumatic power, hydraulic power and electrical power;

a portable friction welding tool operably connected to the power system, said portable friction welding tool com- prising:

a tool housing;

an actuator received in an axially slidable relation to produce a defined stroke within the tool housing;

a rotary motor disposed in the tool housing and engaged to said actuator to slide therewith;

a collet configured to receive the workpiece;

a drivetrain within the tool housing connecting the motor to the collet;

a start input;

an automated control system, comprising:

a motor control system operably connected to the first power input and operably connected to and responsive to a signal from the start input to cause the motor to spin the workpiece;

a first axial thrust control system operably connected to start input and the second power input and disposed to begin to contribute a first thrust com- ponent to the thrust building cycle acting upon the actuator upon receipt of the signal from the start input;

an upset phase control system responsive to axially sliding of the actuator whereby the end of the desired actuator stroke operates to send a signal to the motor controller to cut the motor off and sends a second potential input to the axial thrust building cycle for a combined thrust acting on the actuator and therethrough the motor, drivetrain and collet to act at the interface of the workpiece and sub- strate; and a reset input operable to release the combined thrust on the actuator at the end of a cool down phase; and a clamp selectively engageable to both the substrate and the tool housing to present the workpiece at a desired location on the substrate and resist reactive forces to apply the combined thrust between the workpiece and substrate.

2. An automated portable friction welding system for friction welding a workpiece onto a substrate in accordance with claim 1, further comprising an air inlet and wherein:

the first and second power inputs are provided by a single pneumatic air supply connected to an air inlet of the portable friction welding tool;

the actuator is a forging piston;

the motor is an air motor, the first axial thrust control system is a forging pressure controller admitting the first input of the axial thrust building cycle to drive the forging piston; and the second axial thrust control system is a forging area controller and the second potential input to the axial thrust building cycle only passes to act on the forging piston if it exceeds the pressure provided through the forging pressure controller.

3. An automated portable friction welding system for friction welding a workpiece onto a substrate in accordance with claim 2, wherein:

the forging pressure controller comprising:

an FPC inlet restriction connected to the pneumatic air supply;

an FPC adjustable flow restriction; and a one-way valve;

the forging area controller comprising:

a forging area element aligned with the sliding move- ment of the forging piston and presenting an adjust- able FAC tip fastened to the tool housing; and an FAC seat carried on the forging piston and disposed to receive the FAC tip at the end of the forging piston stroke.

4. An automated portable friction welding system for friction welding a workpiece onto a substrate in accordance with claim 3, further comprising:

a control module comprising:

a SVUCCV, comprising:

a restricted inlet connected to the air supply;

a chamber having a first and second side, the first side being connected to the restricted inlet and the second side being connected to the motor control system;

a one-way valve connected to the second side of the chamber and blocking flow from the second side of the chamber, a fixed restriction connected to the other side of the one-way valve;

a vacuum module, comprising:

a restricted inlet;

a venturi effect producing restriction;

a vacuum module fixed restriction;

a nominal vacuum line take-off between the venturi effect producing restriction and the vacuum mod- ule fixed restriction; and an exit from the vacuum module leading to exhaust through the forging area controller;

a BKCV module having a BKCV inlet and a BKCV outlet, BKCV inlet being connected to the vacuum take-off of the vacuum module; the BKCV further comprising:

a fixed restriction; and a one-way valve connected to the fixed restriction and connected at the BKCV exit to the forging piston;

whereby the system is disposed to pass a second pressure engagement of the FAC tip to the FAC seat seals the exhaust from the vacuum module and pressure backing up reduces the efficiency of the venturi effect producing restriction causing an outflow through the vacuum take-off which cut off the motor acting through the SVUCCV and acts through the BKCV to present the second potential input for the axial thrust building cycle.

5. An automated portable friction welding system for friction welding a workpiece onto a substrate at an interface between the workpiece and the substrate, said system comprising:

a pneumatic power source for providing an air supply;

a portable friction welding tool operably connected to the pneumatic power system, said portable friction welding tool comprising:

a tool housing having a longitudinal axis;

a forging piston received in an axially slidable relation within the tool housing;

a rotary air motor disposed in the tool housing and engaged to said actuator to slide therewith;

a collet configured to receive the workpiece;

a drive train within the tool housing connecting the air motor to the collet;

a start input;

an automated control system, comprising:

a motor control system operably connected to and responsive to a signal from the start input to cause supply air to flow to the motor to spin the workpiece;

an FPC module operably connected to start input and disposed to control input from the air supply to begin a first input to an axial thrust building cycle acting upon the forging piston upon receipt of the signal from the start input; and an FAC module responsive to axial advancement of the forging piston whereby the end of the desired forging piston stroke operates to cut off the air supply to the air motor off and to initiate and then hold a second input to the axial thrust cycle acting on the forging piston and therethrough to the interface of the workpiece and substrate; and a reset input operable to release the axial thrust building cycle in the actuator at the end of a cool down phase.

6. An automated portable friction welding system for friction welding a workpiece onto a substrate in accordance with claim 5, wherein:

the forging pressure controller further comprises:

an FPC inlet restriction connected to the pneumatic air supply;

an FPC adjustable flow restriction; and a one-way valve;

the forging area controller further comprises:

a forging area element aligned with the sliding movement of the forging piston and presenting an adjustable FAC tip fastened to the tool housing; and an FAC seat carried on the forging piston and disposed to receive the FAC tip at the end of the forging piston stroke.

7. An automated portable friction welding system for friction welding a workpiece onto a substrate in accordance with claim 6, said system comprising:

a control module further comprising:

a SVUCCV, comprising:

a restricted inlet connected to the air supply;

a chamber having a first and second side, the first side being connected to the restricted inlet and the second side being connected to the motor control system;

a one-way valve connected to the second side of the chamber and blocking flow from the second side of the chamber;

a fixed restriction connected to the other side of the one-way valve;

a vacuum module, comprising:

a restricted inlet;

a venturi effect producing restriction;

a vacuum module fixed restriction;

a nominal vacuum line take-off between the venturi effect producing restriction and the vacuum module fixed restriction; and an exit from the vacuum module leading to exhaust through the forging area controller;

a BKCV module having a BKCV inlet and a BKCV outlet, BKCV inlet being connected to the vacuum take-off of the vacuum module; the BKCV further comprising:

a fixed restriction; and a one-way valve connected to the fixed restriction and connected at the BKCV exit to the forging piston;

whereby the system is disposed to pass a second pressure engagement of the FAC tip to the FAC seat seals the exhaust from the vacuum module and pressure backing up reduces the efficiency of the venturi effect producing restriction causing an outflow through the vacuum take-off which cut off the motor acting through the SVUCCV and acts through the BKCV to present the second potential input for the axial thrust building cycle.

8. An automated portable friction welding system for friction welding a workpiece onto a substrate in accordance with claim 7, said system further comprising:

a topside equipment module containing the pneumatic power source for the portable friction welding system designed for use below a water surface, said pneumatic power source comprising:

a compressor providing an air supply;

a supply manifold connected to the compressor;

a filtration module cleaning and drying the air supply; and an air supply hose connecting the supply manifold to the portable welding tool; and an exhaust hose having a first and second end and connected to the portable friction welding tool on the first end and disposed to bring the second end to a location above with the water surface, whereby the system operates at one atmospheric pressure and prevents water intrusion.

9. An automated process for friction welding a workpiece onto a substrate at a weld site using a portable friction welding system, said process comprising:

installing the workpiece into a collet of the portable friction welding system;

positioning the workpiece at the weld site and securing a tool housing of the portable friction welding system to the substrate with a clamp;

initiating an automated friction weld cycle beginning with a burn off phase, comprising:

engaging a rotary drive to rapidly spin the workpiece about a longitudinal axis; and engaging a first thrust cycle which progressively builds axial force driving the workpiece against the substrate at the weld site;

whereby rapid spinning and axial thrust of the workpiece against the substrate combine to frictionally heat a localized segment of the weld site;

initiating an upset phase in the automated friction weld cycle, comprising:

plasticizing localized heated material at the weld site;

axially translating the workpiece into the substrate at the weld site;

using the control instruction to disengage the rotary drive to stop spinning the workpiece about its longitudinal axis;

using the control instruction to engage a second axial thrust component acting on the workpiece to advance the workpiece to a final weld position and maintain force pressing the workpiece into substrate at the weld site during a cool down phase; and releasing the workpiece from the collet and withdrawing the collet away from the substrate after the cool down phase; and releasing the clamp to release the portable friction welding system from being secured to the substrate.

10. An automated process for friction welding a workpiece onto a substrate in accordance with claim 9, wherein engaging a rotary drive comprises a step selected from a group consisting of admitting a flow of air to a pneumatic motor, admitting a flow of hydraulic fluid to a hydraulic motor, turning on an electric motor, and engaging a transmission for a motor.

11. An automated process for friction welding in accordance with claim 9, wherein:

the engaging of a rotary drive comprises admitting flow to an air motor;

engaging a first thrust cycle which progressively builds axial force driving the workpiece against the substrate comprises admitting pressure through a variable restrictor to drive a forging piston;

creating a control instruction as a function of the total translation of the workpiece relative to the tool housing comprises installing a FAC module to present an FA controller element axially aligned with and facing the forging piston and presenting an FAC seat in an orifice on the leading face of the forging piston whereby movement of the FA controller element toward the FAC seat in axially translating the workpiece serves to cut off flow through the FAC module, sending high pressure to shut off the air motor and high pressure to the forging piston to engage the second potential axial thrust component.

12. An automated process for friction welding in accordance with claim 11, further comprising a welding tool set up step in which settings for the forging pressure controller and the forging area controller are dialed in to correspond to the materials, size of workpiece and conditions for a welding job.

13. An automated process for friction welding in accordance with claim 11, further comprising carrying the exhaust from running the portable friction welding tool underwater to the surface through a hose whereby the system operates as if running under ambient pressure on the surface and the risk of water intrusion into the tool is mitigated.

14. An automated portable friction welding tool for receiving power from a power source and friction welding a workpiece onto a substrate, said tool comprising:

a tool housing having an axis;

an actuator axially slidably received within the tool housing;

a rotary motor disposed in the tool housing and engaged to said actuator to slide therewith;

a collet configured to receive the workpiece;

a transmission within the tool housing connecting the motor to the collet;

a start input;

an automated control system, comprising:

a motor control system operably connected and responsive to a signal from the start input cause the motor to spin the workpiece;

a first axial thrust control system operably connected to start input and disposed to begin a first input to an axial thrust building cycle acting upon the actuator upon receipt of the signal from the start input;

an upset phase control system responsive to axially sliding of the actuator whereby the end of the desired actuator stroke operates to cut the motor off and to initiate and then hold a second potential input to the axial thrust cycle acting on the actuator and therethrough to the interface of the workpiece and substrate; and a reset input operable to release the thrust in the actuator at the end of a cool down phase.

15. An automated portable friction welding tool in accordance with claim 14, further comprising an air inlet for receiving a pneumatic air supply and wherein:

the actuator is a forging piston;

the motor is an air motor;

the first axial thrust control system is a forging pressure controller admitting the first input of the axial thrust building cycle to drive the forging piston; and the second axial thrust control system is a forging area controller and the second potential input to the axial thrust building cycle only passes to act on the forging piston if it exceeds the pressure provided through the forging pressure controller.

16. An automated portable friction welding tool in accordance with claim 15, wherein:

the forging pressure controller comprising:

an FPC inlet restriction connected to the pneumatic air supply;

an FPC adjustable flow restriction; and a one-way valve;

the forging area controller comprising:

a forging area element aligned with the sliding movement of the forging piston and presenting an adjustable FAC tip fastened to the tool housing; and an FAC seat carried on the forging piston and disposed to receive the FAC tip at the end of the forging piston stroke.

17. An automated portable friction welding tool in accordance with claim 16, further comprising:

a control module comprising:

a SVUCCV, comprising:

a restricted inlet connected to the air supply;

a chamber having a first and second side, the first side being connected to the restricted inlet and the second side being connected to the motor control system;

a one-way valve connected to the second side of the chamber and blocking flow from the second side of the chamber;

a fixed restriction connected to the other side of the one-way valve;

a vacuum module, comprising:
  a restricted inlet;
  a venturi effect producing restriction;
  a vacuum module fixed restriction;
  a nominal vacuum line take-off between the venturi effect producing restriction and the vacuum module fixed restriction; and
  an exit from the vacuum module leading to exhaust through the forging area controller;
  a BKCV module having a BKCV inlet and a BKCV outlet, BKCV inlet being connected to the vacuum take-off of the vacuum module; the BKCV further comprising:
  a fixed restriction; and
  a one-way valve connected to the fixed restriction and connected at the BKCV exit to the forging piston;
  whereby the system is disposed to pass a second pressure engagement of the FAC tip to the FAC seat seals the exhaust from the vacuum module and pressure backing up reduces the efficiency of the venturi effect producing restriction causing an outflow through the vacuum take-off which cut off the motor acting through the SVUCCV and acts through the BKCV to present the second potential input for the axial thrust building cycle.

18. An automated portable friction welding tool in accordance with claim 17, further comprising a stop button connected between the motor controller and exhaust whereby a manual can override the automated control system in the event that the motor cut off appears to not timely engage.

19. An automated portable friction welding tool in accordance with claim 18, further comprising a pressure relief valve connecting the pneumatic circuitry to the exterior of the housing.

20. An automated portable friction welding tool in accordance with claim 18, wherein:
  operator accessibility is enhanced for the start, reset and stop inputs by grouping them together at a rear facing plate on the tool housing; and
  the forging pressure control and the forging area controller are accessible for set up operations at the beginning of a job, but are clearly distinguished from the start, reset and stop inputs.

21. A portable friction welding tool operably connectable to a pneumatic power system, said portable friction welding system comprising:
  a tool housing having a longitudinal axis;
  an axially aligned forging piston received within the tool housing;
  a rotary air motor disposed in the tool housing and engaged to said forging piston to slide therewith;
  a collet configured to receive the workpiece;
  a drive train within the tool housing connecting the air motor to the collet;
  a start input;
  an automated control system, comprising:
    a motor control system operably connected and responsive to a signal from the start input to cause supply air to flow to the motor to spin the workpiece; an FPC module operably connected to the start input and disposed to begin a first thrust building cycle acting upon the forging piston upon receipt of the signal from the start input;
    an FAC module responsive to axial advancement of the forging piston whereby the end of the desired forging piston stroke operates to cut off the air supply to the air motor off and to initiate and then hold a second axial thrust cycle acting on the forging cylinder and therethrough to the interface of the workpiece and substrate; and
  a reset input operable to release the thrust in the actuator at the end of a cool down phase; and
  a Bellville spring stack biasing the forging piston to withdraw from a workpiece when the trust is released.

22. A portable friction welding tool in accordance with claim 21, further comprising a stop button connected between the motor controller and exhaust whereby a manual input can override the automated control system in the event that the motor cut off appears to not timely engage.

23. A portable friction welding tool in accordance with claim 22, wherein:
  operator accessibility is enhanced for the start, reset and stop inputs by grouping them together at a rear facing plate on the tool housing; and
  the forging pressure control and the forging area controller are accessible for set up operations at the beginning of a job, but are clearly distinguished from the start, reset and stop inputs.

24. A method for welding an aluminum workpiece to an aluminum substrate at a weld site in an underwater environment, said method comprising:
  installing the workpiece into a collet of a portable friction welding tool;
  clamping a housing of the portable friction welding tool to the substrate;
  initiating a burn-off phase, comprising:
    engaging a rotary drive to rapidly spin the aluminum workpiece about a longitudinal axis;
    engaging a first thrust cycle which progressively builds axial force driving the aluminum workpiece against the aluminum substrate at the weld site;
    whereby rapid spinning and axial thrust of the aluminum workpiece against the aluminum substrate combine to frictionally heat a localized segment of the weld site;
  initiating an upset phase in an automated friction weld cycle, comprising:
    plasticizing localized heated material at the weld site;
    axially translating the workpiece into the substrate at the weld site;
    using a control instruction to disengage the rotary drive to stop spinning the aluminum workpiece about its longitudinal axis;
  initiating a cool down phase whereby a weld is allowed to fully solidify, comprising:
    holding thrust across the weld;
    allowing the weld to fully solidify;
  releasing the workpiece from the collet and withdrawing the collet away from the substrate; and
    releasing the portable friction welding system tool from being secured to the substrate.

25. A method for welding an aluminum workpiece to an aluminum substrate in an underwater environment in accordance with claim 24, wherein clamping the housing to the substrate further comprises deploying a vacuum clamp and drawing a vacuum to substantially evacuate water from beneath a clamp to substrate interface.

26. A method for welding an aluminum workpiece to an aluminum substrate in an underwater environment in accordance with claim 25, further comprising:
  isolated a sub area at the weld site under the vacuum clamp; and injecting a gas into the sub area creating a dry environment for the weld.

27. A method for welding an aluminum workpiece to an aluminum substrate in an underwater environment in accordance with claim 25 wherein the upset phase further comprises selecting a second thrust drive cycle after disengaging the rotary drive presenting a combination of thrust from the first and second thrust cycles across the weld for the cool down phase.

28. A method for welding an aluminum workpiece to an aluminum substrate in an underwater environment in accordance with claim 27, further comprising using a control input triggered by the distance of axial translation of the workpiece into the substrate and addressing the remaining thrust of the first thrust cycle force at the time of triggering to control a potential second thrust cycle.

29. A method for welding an aluminum workpiece to an aluminum substrate at a weld site in an underwater environment using an automated friction weld cycle, said method comprising:
    installing the workpiece into a collet of a portable friction welding tool;
    clamping a housing of the portable friction welding tool to the substrate;
    initiating a burn-off phase, comprising:
        engaging a rotary drive to rapidly spin the aluminum workpiece about a longitudinal axis;

engaging a first thrust cycle which progressively builds axial force driving the aluminum workpiece against the aluminum substrate at the weld site;
        whereby rapid spinning and axial thrust of the aluminum workpiece against the aluminum substrate combine to frictionally heat a localized segment of the weld site;
    initiating an upset phase, comprising:
        plasticizing localized heated material at the weld site;
        axially translating the workpiece into the substrate at the weld site;
        using a control instruction to disengage the rotary drive to stop spinning the aluminum workpiece about its longitudinal axis;
    initiating a cool down phase whereby a weld is allowed to fully solidify, comprising:
        selectively engaging a potential second thrust cycle following disengagement of the rotary drive as a function of the trust remaining from the first thrust cycle
        holding thrust across the weld;
        allowing the weld to fully solidify;
        releasing the thrust;
    releasing the workpiece from the collet and withdrawing the collet away from the substrate; and
        releasing the portable friction welding tool from being secured to the substrate.

\* \* \* \* \*